United States Patent
Herschfelt et al.

(10) Patent No.: US 12,355,526 B2
(45) Date of Patent: Jul. 8, 2025

(54) MULTI-STAGE DISTRIBUTED BEAMFORMING FOR DISTRIBUTED MOSAIC WIRELESS NETWORKS

(71) Applicants: Andrew Herschfelt, Phoenix, AZ (US); Jacob Holtom, Tempe, AZ (US); Owen Ma, Phoenix, AZ (US); Daniel W. Bliss, Phoenix, AZ (US)

(72) Inventors: Andrew Herschfelt, Phoenix, AZ (US); Jacob Holtom, Tempe, AZ (US); Owen Ma, Phoenix, AZ (US); Daniel W. Bliss, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 18/431,169

(22) Filed: Feb. 2, 2024

(65) Prior Publication Data

US 2025/0038803 A1 Jan. 30, 2025

Related U.S. Application Data

(63) Continuation of application No. 17/688,383, filed on Mar. 7, 2022, now Pat. No. 11,936,450.
(Continued)

(51) Int. Cl.
*H04B 7/06* (2006.01)
*H04B 1/04* (2006.01)
(Continued)

(52) U.S. Cl.
CPC ......... *H04B 7/0617* (2013.01); *H04B 1/0475* (2013.01); *H04B 7/0619* (2013.01); *H04L 1/16* (2013.01); *H04L 25/0202* (2013.01)

(58) Field of Classification Search
CPC .. H04B 7/0617; H04B 1/0475; H04B 7/0619; H04B 2001/0425; H04B 7/024;
(Continued)

(56) References Cited

U.S. PATENT DOCUMENTS

2001/0001616 A1* 5/2001 Rakib ................. H04L 1/006
375/259
2009/0147728 A1* 6/2009 Atia ..................... H04B 7/0617
370/321
(Continued)

OTHER PUBLICATIONS

Bliss, D.W. et al., "Adaptive Wireless Communications: MIMO Channels and Networks," Cambridge University Press, 2013, 619 pages.
(Continued)

*Primary Examiner* — Sung S Ahn
(74) *Attorney, Agent, or Firm* — Womble Bond Dickinson (US) LLP

(57) ABSTRACT

Multi-stage distributed beamforming for distributed mosaic wireless networks is provided. Embodiments described herein present systems, devices, and methods that provide increased range, data rate, and robustness to interference and jamming. A distributed mosaic wireless network includes a transmitter, a receiver, and one or more distributed clusters of radios referred to herein as mosaics or relay mosaics. Each mosaic consists of several distributed, cooperative radio transceivers (e.g., mosaic nodes) that relay a signal sent by the transmitter towards the receiver. In some embodiments, a single-stage beamforming technique is implemented whereby the transmitter sends a signal to a first mosaic, which then relays this signal by beamforming to the receiver. In some embodiments, a multi-stage beamforming technique is implemented whereby the transmitter sends a signal to a first mosaic, which then relays this signal by
(Continued)

beamforming to a second mosaic, which then relays this signal by beamforming to the receiver.

20 Claims, 16 Drawing Sheets

Related U.S. Application Data

(60) Provisional application No. 63/157,220, filed on Mar. 5, 2021.

(51) Int. Cl.
  *H04L 1/16* (2023.01)
  *H04L 25/02* (2006.01)

(58) Field of Classification Search
  CPC ............... H04L 1/16; H04L 25/0202; H04L 2001/0097; H04L 25/021
  See application file for complete search history.

(56) References Cited

U.S. PATENT DOCUMENTS

| | | | | |
|---|---|---|---|---|
| 2011/0116487 A1* | 5/2011 | Grandhi | ............... | H04W 72/20 370/350 |
| 2011/0170425 A1* | 7/2011 | Horiuchi | ............... | H04B 7/155 370/242 |
| 2022/0286172 A1 | 9/2022 | Herschfelt et al. | | |

OTHER PUBLICATIONS

Bliss, D.W. et al., "Environmental issues for MIMO capacity," IEEE Transactions on Signal Processing, vol. 50, No. 9, Sep. 2002, IEEE, pp. 2128-2142.

Bliss, D.W. et al., MIMO Communication Capacity Using Infinite Dimension Random Matrix Eigenvalue Distributions, IEEE Asilomar Conference on Signals, Systems and Computers, vol. 2, Nov. 2001, 6 pages.

Bliss, D.W. et al., "MIMO wireless communication channel phenomenology," IEEE Transactions on Antennas and Propagation, vol. 52, No. 8, Aug. 2004, IEEE, 10 pages.

Bliss, D.W. et al., "Robust MIMO wireless communication in the presence of interference using ad hoc antenna arrays," IEEE Military Communications Conference (MILCOM 2003), Oct. 13-16, 2002, Boston, MA, USA, IEEE, 4 pages.

Bliss, D.W. et al., "Simultaneous Transmission and Reception for Improved Wireless Network Performance," Conference Proceedings of the 2007 IEEE/SP 14th Workshop on Statistical Signal Processing, Aug. 26-29, 2007, Madison, WI, USA, IEEE, 5 pages.

Bliss, D.W. et al., "Transmit and receive space-time-frequency adaptive processing for cooperative distributed mimo communications," IEEE International Conference on Acoustics, Speech and Signal Processing (ICASSP), Mar. 25-30, 2012, Kyoto, Japan, IEEE, 4 pages.

Herschfelt, A. et al., "Joint Positioning-Communications System Design and Experimental Demonstration," 2019 IEEE/AIAA 38th Digital Avionics Systems Conference (DASC), Sep. 8-12, 2019, San Diego, CA, USA, IEEE, 6 pages.

Herschfelt, A. et al., "Joint Positioning-Communications System Design: Leveraging Phase-Accurate Time-of-Flight Estimation and Distributed Coherence," 2018 52nd Asilomar Conference on Signals, Systems, and Computers, Oct. 28-31, 2018, Pacific Grove, CA, USA, IEEE, 5 pages.

Herschfelt, A. et al., "Joint Positioning-Communications System : Optimal Distributed Coherence and Positioning Estimators," 2019 53rd Asilomar Conference on Signals, Systems, and Computers, Nov. 3-6, 2019, Pacific Grove, CA, USA, IEEE, 5 pages.

Herschfelt, A., "Simultaneous Positioning and Communications: Hybrid Radio Architecture, Estimation Techniques, and Experimental Validation," A Dissertation Presented in Partial Fulfillment of the Requirement for the Degree Doctor of Philosophy, Arizona State University, Dec. 2019, 119 pages.

Kraut, S. et al., "Reducing the fractional rank of interference with space-time-frequency adaptive beamforming," 2013 Asilomar Conference on Signals, Systems and Computers, Nov. 3-6, 2013, Pacific Grove, CA, USA, IEEE, 4 pages.

Margetts, A. et al., "Loss characterization of distributed space-time transmit beamforming with embedded channel probing," IEEE Statistical Signal Processing Workshop (SSP), Aug. 5-8, 2012, Ann Arbor, MI, USA, IEEE, 4 pages.

Yu, H. et al., "WISCA SDR network," 2017 IEEE Military Communications Conference (MILCOM), Oct. 23-25, 2017, Baltimore, MD, USA, IEEE, 6 pages.

Non-Final Office Action for U.S. Appl. No. 17/688,383, mailed Jun. 22, 2023, 16 pages.

Notice of Allowance for U.S. Appl. No. 17/688,383, mailed Nov. 24, 2023, 8 pages.

\* cited by examiner

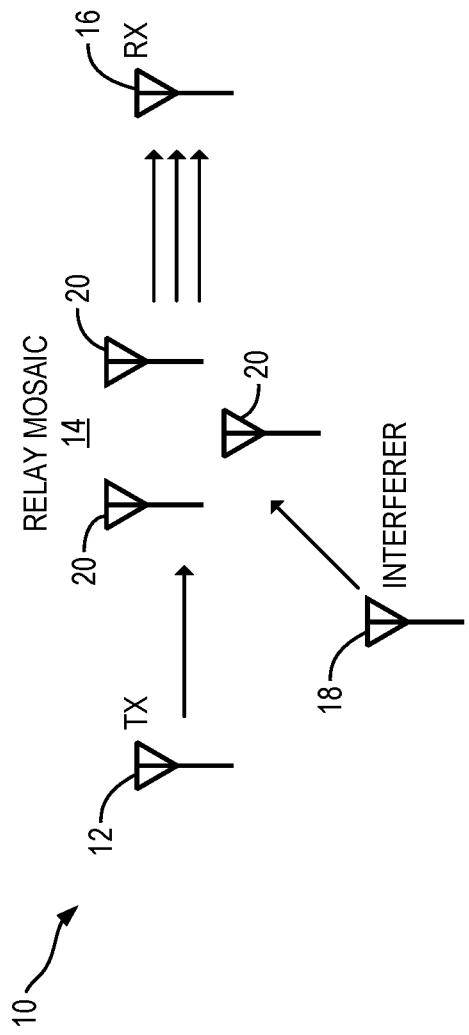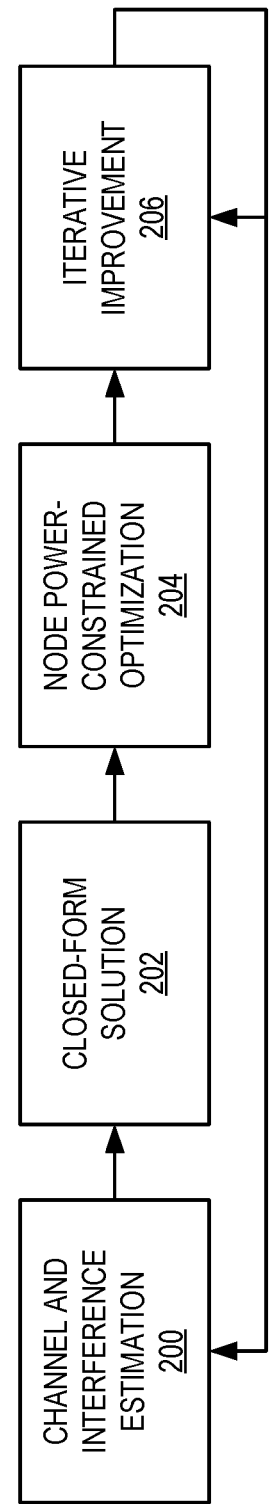

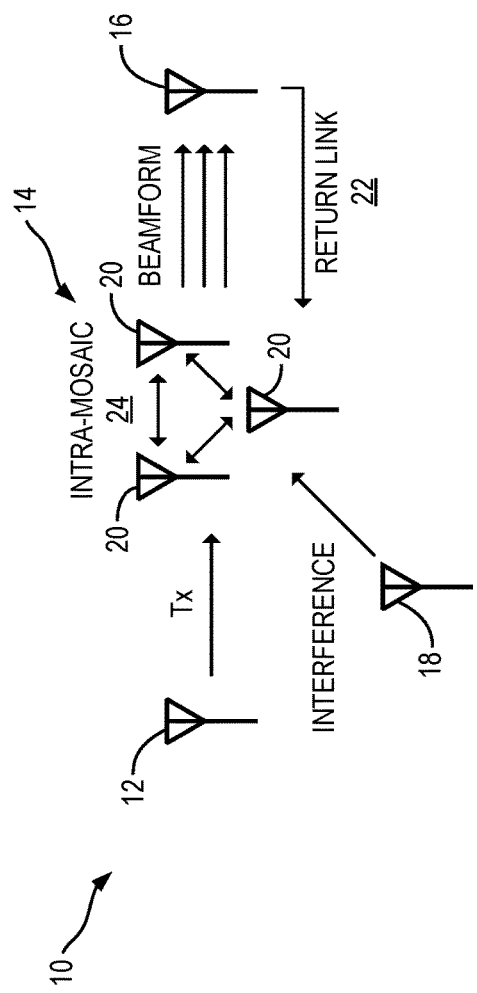
FIG. 3
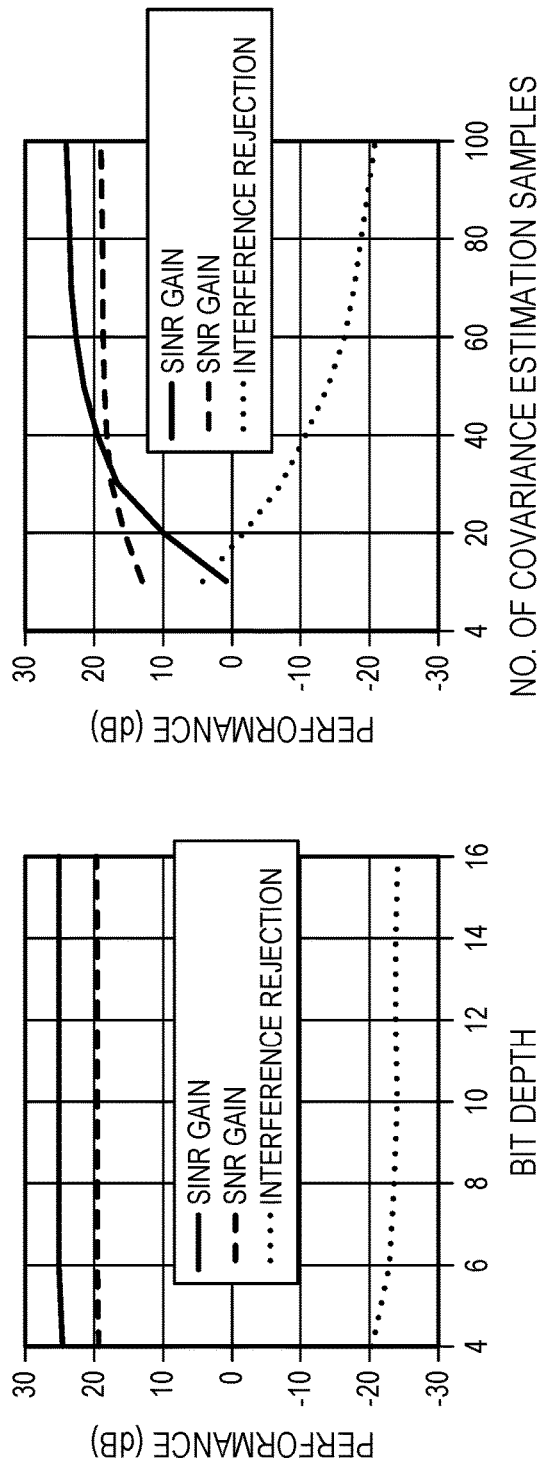
FIG. 4B
FIG. 4A

MULTI-STAGE DISTRIBUTED BEAMFORMING FOR DISTRIBUTED MOSAIC WIRELESS NETWORKS

RELATED APPLICATIONS

This application is a continuation of U.S. patent application Ser. No. 17/688,383, filed Mar. 7, 2022, which claims the benefit of provisional patent application Ser. No. 63/157,220, filed Mar. 5, 2021, the disclosures of which are hereby incorporated herein by reference in their entirety.

FIELD OF THE DISCLOSURE

The present disclosure is related to beamforming in wireless communications systems.

BACKGROUND

Beamforming is a traditional signal processing technique that uses multiple antennas to either maximize transmitted radio frequency (RF) energy to a certain point in space or to maximize the received RF energy from a certain direction. In transmit beamforming, a multi-antenna transmitter carefully tunes the transmit phase of each antenna element to create constructive interference between the signals in a direction of interest. Similarly, in receive beamforming, a multi-antenna receiver carefully tunes the receive phase of each antenna element to increase the received power from a certain direction. In many applications, beamforming is used to efficiently deliver or receive RF energy in specific directions.

The performance and capabilities of a beamformer depend on the geometry of the antenna elements. Spacing these elements far apart increases the effective aperture of the antenna array, which improves spatial resolution, but if the antennas are placed too far apart then spatial ambiguities are introduced. Historical beamforming techniques are therefore traditionally limited to antenna spacing less than the wavelength of the signal divided by 2 to avoid these ambiguities. Unfortunately, this limits the spatial resolution of the antenna array, and building larger arrays requires a large number of antennas.

SUMMARY

Multi-stage distributed beamforming for distributed mosaic wireless networks is provided. Embodiments described herein present systems, devices, and methods that provide increased range, data rate, and robustness to interference and jamming. A distributed mosaic wireless network includes a transmitter, a receiver, and one or more distributed clusters of radios referred to herein as mosaics or relay mosaics. Each mosaic consists of several distributed, cooperative radio transceivers (e.g., mosaic nodes) that relay a signal sent by the transmitter towards the receiver. In some embodiments, a single-stage beamforming technique is implemented whereby the transmitter sends a signal to a first mosaic, which then relays this signal by beamforming to the receiver. In some embodiments, a multi-stage beamforming technique is implemented whereby the transmitter sends a signal to a first mosaic, which then relays this signal by beamforming to a second mosaic (and so on to additional mosaics if needed), which then relays this signal by beamforming to the receiver.

For N radios in the first mosaic and M radios in the second mosaic, this technique theoretically increases the received signal to noise ratio (SNR) at the receiver by a factor of $M*N^2$ compared to a traditional single-antenna to single-antenna (SISO) link in the absence of interference. In the presence of interference, the signal-to-interference-plus-noise ratio (SINR) improvement is significantly greater for a wide range of environments. Evaluation results demonstrate that this technique approaches the theoretical performance in over-the-air experiments.

An exemplary embodiment provides a method for beamforming in a distributed wireless network. The method includes receiving a signal at one or more of a first plurality of mosaic nodes, applying a first predistortion filter at each node of the first plurality of mosaic nodes, and retransmitting the signal from the first plurality of mosaic nodes toward a first receiving target. The first predistortion filter causes a resulting first retransmitted signal to coherently combine at the first receiving target.

Another exemplary embodiment provides a radio frequency (RF) node for a mosaic network. The RF node includes a wireless transceiver and processing circuitry coupled to the wireless transceiver. The processing circuitry is configured to receive an RF signal at the wireless transceiver, apply a predistortion filter to the RF signal to produce a retransmitted signal, and retransmit the retransmitted signal such that the retransmitted signal coherently combines with one or more additional retransmitted signals to increase signal power in a direction of a receiving target.

Another exemplary embodiment provides a system. The system includes a network of mosaic RF nodes, wherein the network of mosaic RF nodes is configured to receive an RF signal from a transmitting RF node and wirelessly coordinate to beamform the RF signal toward a target RF node.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is a topological diagram of a wireless system which implements single-stage distributed beamforming according to embodiments described herein.

FIG. 2 is a flow diagram of a process for computing the pre-distortion spatial filter for retransmission of a received signal by the mosaic of FIG. 1.

FIG. 3 is a topological diagram of the wireless system of FIG. 1, illustrating information exchange in the wireless system.

FIG. 4A is a graphical representation of performance of the wireless system of FIG. 3 as a function of bit depth.

FIG. 4B is a graphical representation of performance of the wireless system of FIG. 3 as a function of covariance estimation samples.

DETAILED DESCRIPTION

Figure 5:
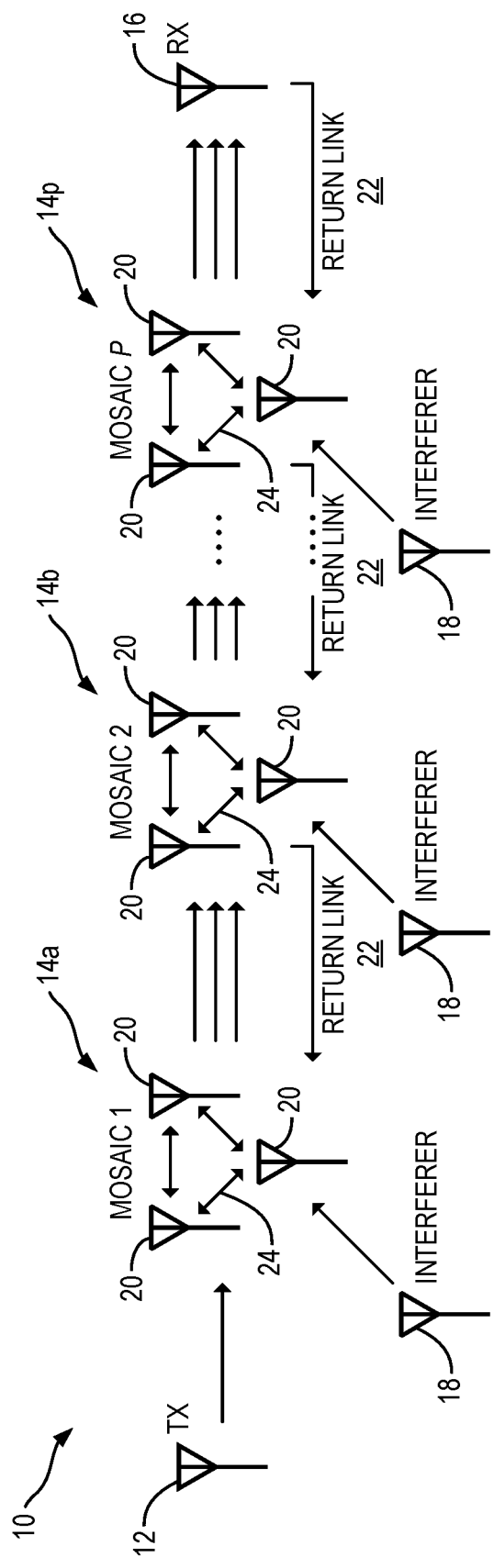
FIG. 5 is a topological diagram of a wireless system which implements multi-stage distributed beamforming according to embodiments described herein.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Multi-stage distributed beamforming for distributed mosaic wireless networks is provided. Embodiments described herein present systems, devices, and methods that provide increased range, data rate, and robustness to interference and jamming. A distributed mosaic wireless network includes a transmitter, a receiver, and one or more distributed clusters of radios referred to herein as mosaics or relay mosaics. Each mosaic consists of several distributed, cooperative radio transceivers (e.g., mosaic nodes) that relay a signal sent by the transmitter towards the receiver. In some embodiments, a single-stage beamforming technique is implemented whereby the transmitter sends a signal to a first mosaic, which then relays this signal by beamforming to the receiver. In some embodiments, a multi-stage beamforming technique is implemented whereby the transmitter sends a signal to a first mosaic, which then relays this signal by beamforming to a second mosaic (and so on to additional mosaics if needed), which then relays this signal by beamforming to the receiver.

For N radios in the first mosaic and M radios in the second mosaic, this technique theoretically increases the received signal-to-noise ratio (SNR) at the receiver by a factor of $M*N^2$ compared to a traditional single-antenna to single-antenna (SISO) link in the absence of interference. In the presence of interference, the signal-to-interference-plus-noise ratio (SINR) improvement is significantly greater for a wide range of environments. Evaluation results demonstrate that this technique approaches the theoretical performance in over-the-air experiments.

Introduction

Beamformers are implemented by controlling the phase of each antenna element with extreme precision. Distributed beamforming is a modern variation of this traditional technique wherein the individual antenna elements are replaced by individual radio systems that are widely separated in space (compared to the wavelength divided by 2). The carrier phase ambiguities of traditional beamforming are introduced because the carrier phase constantly rotates over time, so different points in time have the same phase and cannot be distinguished. These ambiguities are traditionally resolved by placing the antenna elements very close together such that the carrier phase does not have time to complete a rotation in the small amount of time that a signal leaves or enters the different elements.

These ambiguities may instead be resolved by simply aligning the absolute time of each distributed radio system precisely compared to a carrier cycle, commonly referred to as "distributed coherence." This has historically been a monumental challenge, but as the electronics and processing techniques improved, achieving sub-carrier timing synchronization has suddenly become entirely feasible. As such, embodiments described herein can replace the individual antenna elements with individual radio systems that are very far apart, creating very large apertures with only a small number of antennas. This dramatically improves beamforming precision while reducing complexity and power consumption. Modern distributed beamforming results are leveraged to demonstrate the achievable performance of such a distributed beamformer in an experimental demonstration.

In this regard, a single- or multi-stage distributed beamforming technique is designed, implemented, and demonstrated which dramatically increases the power delivery from a transmitter to a receiver using distributed relay networks of simple radios (mosaics). This system includes an initial transmitter (e.g., single-antenna transmitter), one or more mosaic networks, and a target receiver (e.g., a single-antenna receiver). Each mosaic computes an optimal pre-distortion spatial filter to implement a distributed beamformer toward its target (e.g., a receiver node or the next mosaic in a chain of mosaics).

An aspect of this system design is the computation and optimization of the pre-distortion spatial filters at the mosaic(s). For example, a two-stage distributed beamforming system includes two such filters: one for the channel between a first mosaic and second mosaic, and another for the channel between the second mosaic and the target receiver. These filters are computed by sending test signals into these channels and measuring the distortions induced by the propagation between radios.

Given these measurements, filters are computed which effectively distribute the transmit energy for each channel in the optimal directions to maximize the energy that arrives at the receiving radio(s). As the channel evolves, whether through changes in the environment, relative motion of the radios, or other external effects, these pre-distortion spatial filters need to be reevaluated to maintain optimal performance.

This technology offers several advantages over traditional beamforming techniques. For example, carrier phase ambiguities are resolved by precise distributed coherence, so the mosaic elements may be widely separated in space, thereby increasing the effective aperture of the synthetic arrays and improving the spatial resolution of the beamformer. The processing gain of this technique is higher than that of traditional beamforming techniques, so either more energy can be delivered to a receiver with the same transmit energy or the same amount of energy can be delivered to a receiver with less transmit energy. This system is more robust to external interference, which makes it more stable in increasingly congested spectral environments.

Distributed Mosaic Communications System

FIG. 1 is a topological diagram of a wireless system 10 which implements single-stage distributed beamforming according to embodiments described herein. The wireless system 10 includes a transmitter node 12, a relay mosaic 14, and a receiver node 16. The primary objective of the wireless system 10 is to deliver a signal from the transmitter node 12 to the receiver node 16 (e.g., a target node). Without the aid of the mosaic 14, these two radios would be limited to a single-antenna link, which limits the achievable power delivery and is vulnerable to external interference from one or more radio interferers 18. The mosaic 14 is a network of mosaic nodes 20, which cooperatively beamform and retransmit the signal in order to maximize signal in the direction of the receiver node 16 while minimizing interference from any interferers 18.

In this regard, the transmitter node 12 transmits a signal that is received by one or more of the mosaic nodes 20 in the mosaic 14. The mosaic 14 computes an optimal pre-distortion spatial filter to implement a distributed beamformer between the mosaic 14 and the receiver node 16. Each mosaic node 20 in the mosaic 14 applies this filter and retransmits the received signal to the receiver node 16.

FIG. 2 is a flow diagram of a process for computing the pre-distortion spatial filter for retransmission of a received signal by the mosaic 14 of FIG. 1.

The process begins at operation 200, with estimating the channel and interference for transmission to the receiver node 16. The process continues at operation 202, with calculating a closed-form beamforming solution for the mosaic 14. The process continues at operation 204, with the mosaic nodes 20 optimizing the solution according to power constraints. The process continues at operation 206, with iteratively improving the pre-distortion spatial filter based on performance of retransmission, returning the process to operation 200.

FIG. 3 is a topological diagram of the wireless system 10 of FIG. 1, illustrating information exchange in the wireless system 10. To improve the channel estimation at operation 200 of FIG. 2, in some embodiments a return link 22 is established between the receiver node 16 and the mosaic 14. Through the return link 22, the receiver node 16 shares channel estimates with one or more of the mosaic nodes 20.

In addition, intra-mosaic links 24 can be established between the mosaic nodes 20 to distribute the channel estimates from the receiver node 16, signal information, and/or synchronization information. In some embodiments, the information exchanged via the intra-mosaic links 24 can include time and frequency data necessary for synchronization of the beamformed retransmission of the signal, representative data about the signal to be retransmitted (which can include a portion or the entire signal), interference information (e.g., interference measurements made by the mosaic nodes 20), and channel data (e.g., the channel estimates from the receiver node 16).

As the wireless system 10 scales up to larger numbers of mosaic nodes 20, the number of intra-mosaic links 24 increases, which can also congest communication channels. Accordingly, embodiments of the wireless system 10 compress or otherwise reduce the data distributed over the return link 22 and/or the intra-mosaic links 24 to balance system performance and data rate.

FIG. 4A is a graphical representation of performance of the wireless system 10 of FIG. 3 as a function of bit depth. One approach to improve the shared data rate is to use fewer bits on the return link 22 and/or the intra-mosaic links 24. As FIG. 4A illustrates, as few as four bits may be sufficient for performance of the wireless system 10 and more than 8 bits does not significantly improve performance.

FIG. 4B is a graphical representation of performance of the wireless system 10 of FIG. 3 as a function of covariance estimation samples. Another approach to improve the shared data rate is to share fewer samples between the mosaic nodes 20 over the intra-mosaic links 24. In an illustrated embodiment, a 200×200 covariance matrix is used for channel estimation. Under a conservative approach, 2000 samples may be shared to ensure performance of the wireless system 10. However, the SNR, SINR, and interference rejection of the illustrated embodiment converges at approximately 100 samples. Therefore, embodiments may improve the data rate by sharing ~20× fewer samples. It should be understood that other data compression techniques may also be used, including lossless or lossy compression approaches to improve the data rate of the wireless system 10 while maintaining performance.

FIG. 5 is a topological diagram of a wireless system 10 which implements multi-stage distributed beamforming according to embodiments described herein. The wireless system 10 includes a transmitter node 12, two or more relay mosaics 14a, 14b, 14p, and a receiver node 16. The relay mosaics 14a, 14b, 14p are generally cascaded together to provide an increased transmission range and/or to mitigate interference and channel blockages (e.g., blocking structures or other passive interferers) between the transmitter node 12 and the receiver node 16.

In this regard, the transmitter node 12 transmits a signal that is received by one or more mosaic nodes 20 in a first mosaic 14a. The first mosaic 14a computes an optimal pre-distortion spatial filter to implement a distributed beamformer between the first mosaic 14a and a second mosaic 14b. Each mosaic node 20 in the first mosaic 14a applies this filter and retransmits the received signal to the second mosaic 14b. The second mosaic 14b operates similarly, until the Pth mosaic 14p computes an optimal pre-distortion spatial filter to implement a distributed beamformer between the Pth mosaic 14p and the receiver node 16. The Pth mosaic 14p applies this filter to the signal it received from the previous stage and retransmits the signal to the receiver node 16.

At each stage, a return link 22 is established between a given mosaic 14a, 14b, 14p and its receiving target (e.g., the next mosaic 14a, 14b, 14p or the receiver node 16). In addition, intra-mosaic links 24 are established between the mosaic nodes 20 at each stage to distribute the channel estimates from its receiving target (e.g., the next mosaic 14a, 14b, 14p or the receiver node 16), signal information, and/or synchronization information.

Two-Stage Example

Figure 6A:
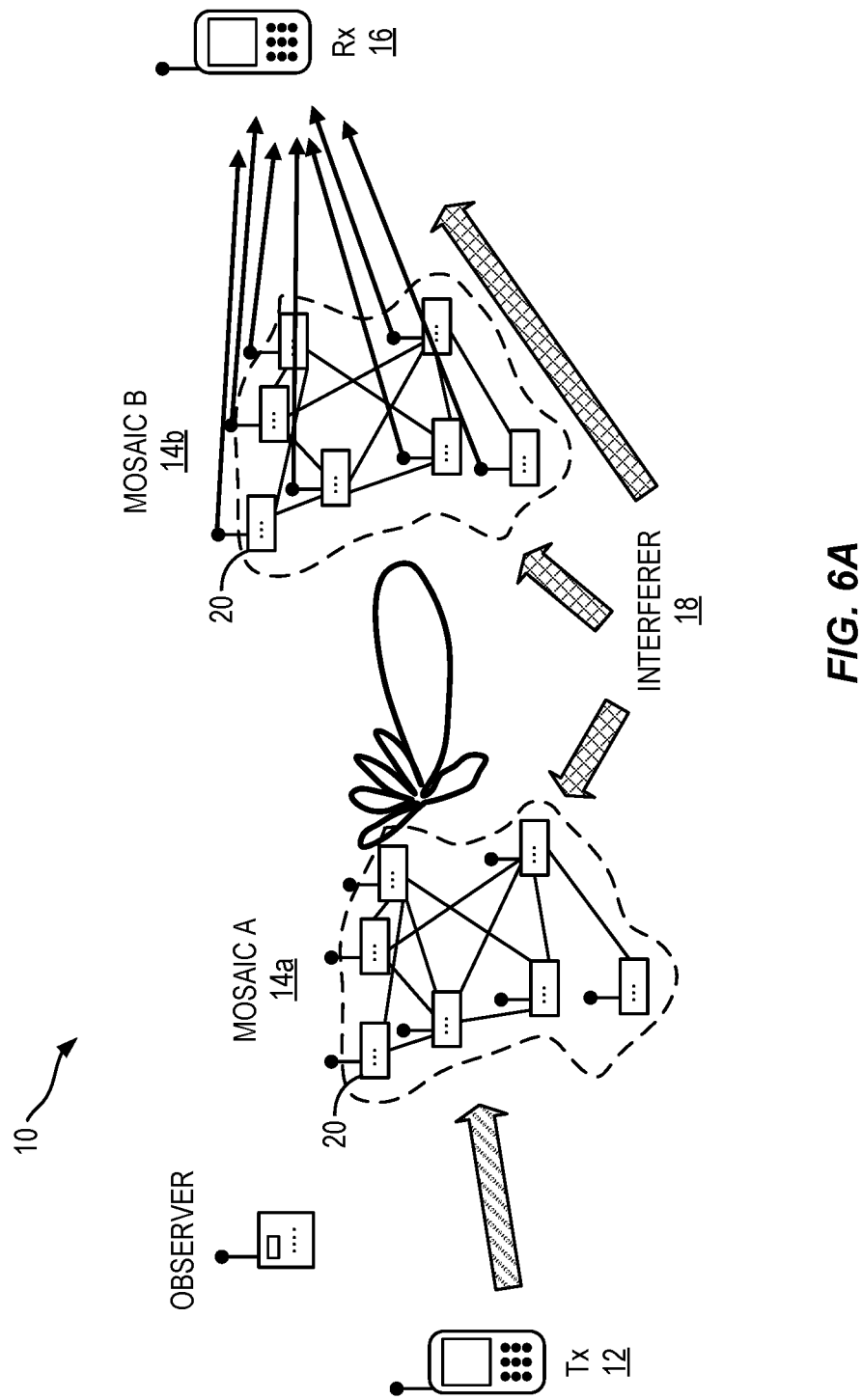
FIG. 6A is a topological diagram of a two-stage distributed mosaic communications system according to embodiments described herein.

FIG. 6A is a topological diagram of a two-stage distributed mosaic communications system according to embodiments described herein. This two-stage embodiment of the wireless system 10 is used for evaluation of the systems and methods described herein. With the aid of a first mosaic 14a and a second mosaic 14b, the power delivery to the receiver node 16 is increased by a factor of $M*N^2$, where N is the number of elements in the first mosaic 14a and M is the number of elements in the second mosaic 14b.

Figure 6B:
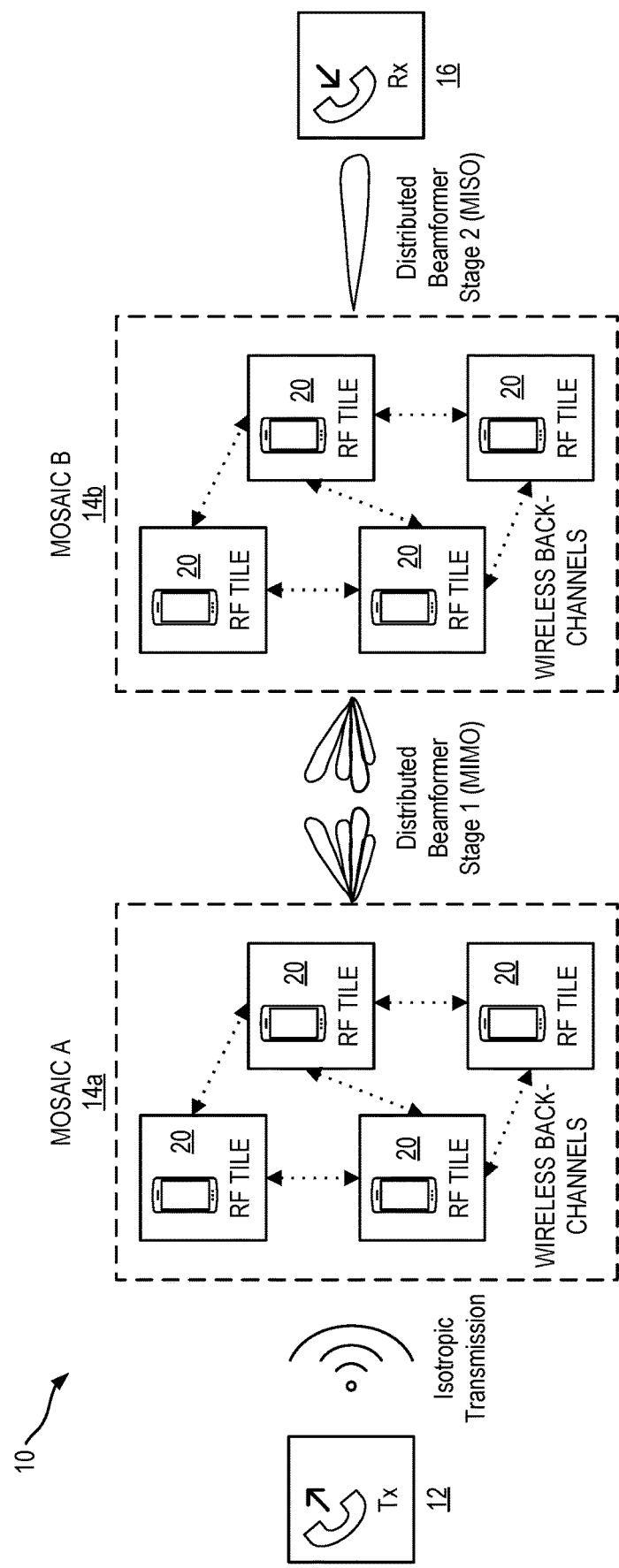
FIG. 6B is a more detailed schematic diagram of the two-stage distributed mosaic communications system of FIG. 6A.

FIG. 6B is a more detailed schematic diagram of the two-stage distributed mosaic communications system of FIG. 6A. To extend and improve the performance of a typical communications link from the transmitter node 12 to the receiver node 16, mosaics of distributed helper radios are deployed. Embodiments described herein develop and implement a novel set of techniques that fully exploit the distributed nodes to maximize link range, data rate, and robustness.

In this regard, a signal is sent from the transmitter node 12 (Tx). The original radio signal is transformed; it is shifted in frequency, has training signals incorporated, and potentially is compressed. This signal is distributed amongst the local first mosaic 14a of RF tiles 20 and is potentially transformed again. An optimized set of distributed pre-distortion filters (one for each RF tile 20) is applied to a common data transmission signal that operate as a wideband beamformer. This beamformer maximizes the SINR at the receiving second mosaic 14b.

At the second mosaic 14b, the signal is received, potentially transformed, and transmitted to the receiver node 16 (Rx) by using a wideband beamformer that is implemented as a set of pre-distortion filters. This second mosaic 14b-to-receiver node 16 beamforming implements what would typically be performed in a receive beamforming, including interference mitigation; however, traditional receive beamforming would require high-data-rate links between the second mosaic 14b RF tiles 20 and receiver node 16. By implementing the function of the receive beamforming in the second mosaic 14b-to-receiver node 16 link, the data rate requirements are significantly reduced at the expense of greater sensitivity to second mosaic 14b-to-receiver node 16 channel estimation accuracy. Simultaneously, the link is duplicated in reverse as the receiver node 16 transmits to the transmitter node 12 on different carrier frequencies.

Figure 7:
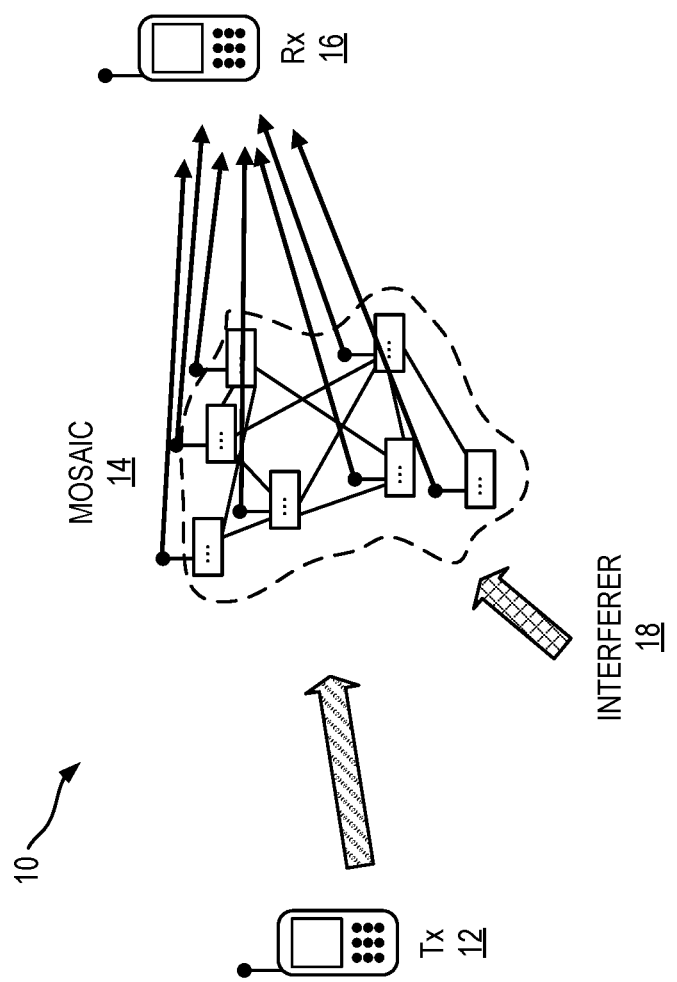
FIG. 7 is a topological diagram of a distributed mosaic communications system with a single mosaic according to embodiments described herein.

FIG. 7 is a topological diagram of a distributed mosaic communications system 10 with a single mosaic 14 according to embodiments described herein. With minor modifications of the algorithms, other topologies are addressed.

Distributed single-input multiple-output (SIMO) and multiple-input single-output (MISO) topologies are enabled as depicted in FIG. 7.

Figure 8:
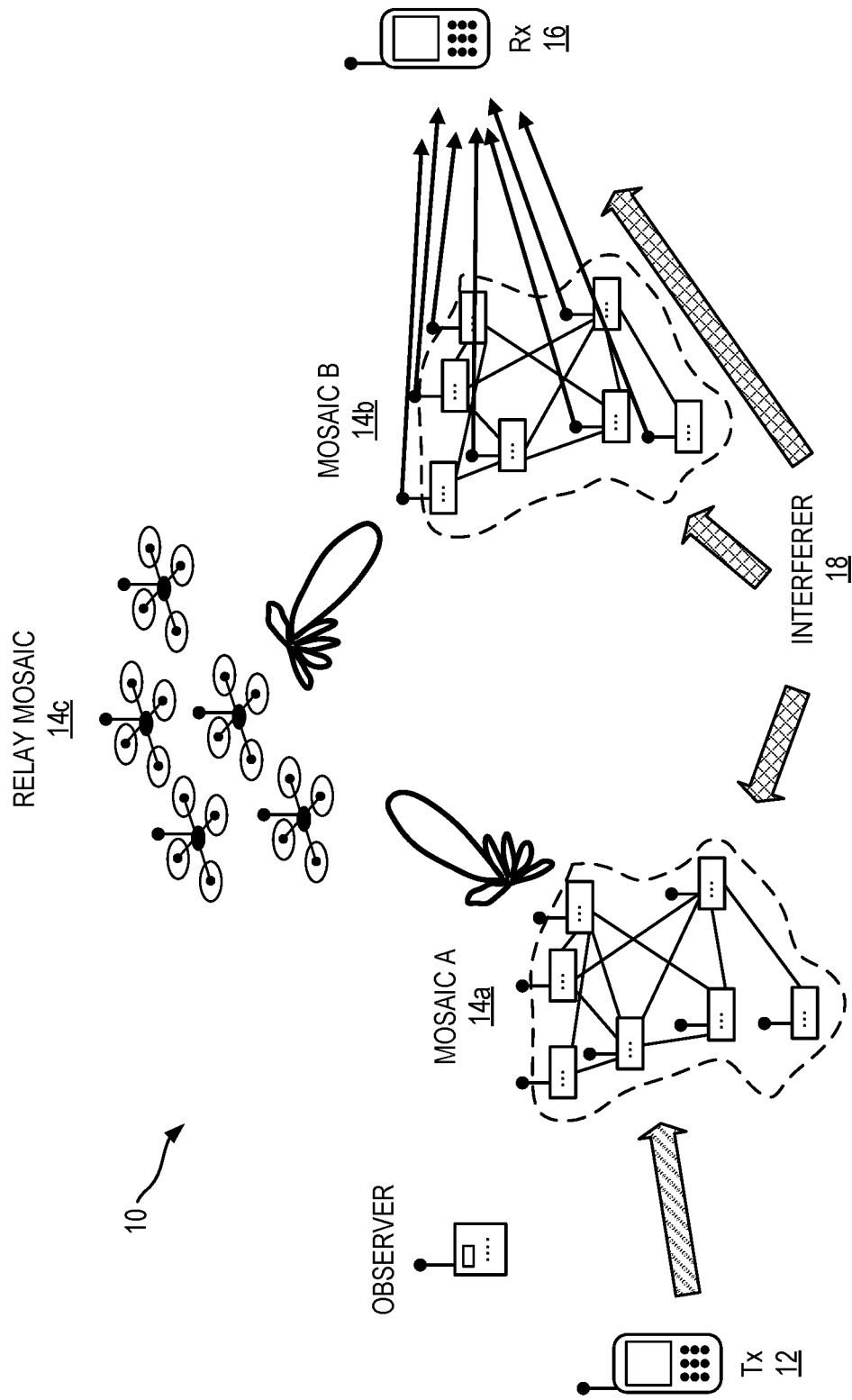
FIG. 8 is a topological diagram of a distributed mosaic communications system with mosaic relay according to embodiments described herein.

FIG. 8 is a topological diagram of a distributed mosaic communications system with mosaic relay according to embodiments described herein. By cascading multiple-input multiple-output (MIMO) techniques, SIMO-MIMO-MIMO-MISO communications are enabled as depicted in FIG. 8. In the depicted example, the wireless system 10 includes the first mosaic 14a which receives the signal from the transmitter node 12 and the second mosaic 14b which retransmits the signal to the receiver node 16. A relay mosaic 14c (e.g., a plurality of unmanned aerial vehicles (UAVs) with RF transceivers) is placed between the first mosaic 14a and the second mosaic 14b such that the signal is relayed from the first mosaic 14a to the relay mosaic 14c to the second mosaic 14b.

For the sake of introduction, narrowband systems are first considered. After establishing a general approach for this system, the formulation is extended to wideband systems.

If ideal channel knowledge is assumed, then the underlying theory is reasonably well understood, although not commonly employed. A critical aspect of this channel knowledge is the interference-plus-noise covariance matrix component. This typically is a computationally expensive operation. For distributed arrays, its evaluation is intrinsically difficult because accumulating in-phase and quadrature (IQ) samples of all signals requires excessive mosaic network traffic. In principle, channel estimation is not fundamentally required; only estimation of the beamformers is needed.

Typically, channel estimates are used to calculate beamformers; however, iterative techniques (such as greedy searches) can perform this evaluation without explicitly estimating the channels. Unfortunately, for scenarios in high-dimensional spaces with low SINR, the convergence of purely iterative techniques is slow. A hybrid direct and iterative estimation approach is employed to address these issues. Finally, synchronization in timing and frequency must be estimated between all nodes.

This disclosure identifies optimal and near-optimal distributed beamforming strategies. Alternative interference-plus-noise covariance matrix estimation approaches are investigated. Beamforming convergence rates are improved by employing hybrid-estimation approaches. Distributed channel estimation is improved by using hierarchical approaches. Computational complexity is evaluated and reduced by employing hybrid beamformer and hierarchical channel estimation approaches. Intra-mosaic synchronization in timing and frequency is implemented by trading coherence ambiguities for system resources.

Compound SIMO-MIMO-MISO Channel

For the compound problem illustrated in FIG. 6A, multiple communications propagation channels must be considered $$h_{A \to m_A} \in \mathbb{C}^{n_{m_A} \times 1}, H_{m_A \to m_B} \in \mathbb{C}^{n_{m_A} \times n_{m_B}}, \text{ and } h_{m_B \to B} \in \mathbb{C}^{n_{m_B} \times 1}.$$

Additionally, the effect of interference at each point in the system has to be considered. If a simple bent-pipe approach is assumed, such that the received signal is transformed and retransmitted, this interference is included at the next stage. Any potential interference at each reception stage is given by $J_{m_A}T_{m_A}$, $J_{m_B}T_{m_B}$, and $Z_B + j_B \underline{t}_B$, where J or j is used to represent the interference propagation channel and T or $\underline{t}$ is used to indicate the interference time-domain signal. The underline $\cdot$ is used to indicate a row vector. Here, the narrowband description is continued and will be extended to the wideband case. The optimized cost function is to maximize the SINR at the receiver node 16.

The received signal is constructed at each stage. The number $n_s$ of received signal samples $$Z_A \in \mathbb{C}^{n_{m_A} \times n_s}$$

at the first mosaic 14a is given by:

$$Z_A = h_{A \to m_A} + J_{m_A} T_{m_A} + N_{m_A} \qquad \text{Equation 1}$$

By assuming that the baseband signal is not modified and is retransmit through a beamformed bent-pipe approach, the received $Z_B \in$ $$\mathbb{C}^{n_{m_B} \times n_s}$$

at the second mosaic 14b is then given by:

$$Z_B = H_{m_A \to m_B}(v_A \underline{1} \odot Z_A) + J_{m_B} T_{m_B} + N_{m_B} \qquad \text{Equation 2}$$

where $\underline{1}$ is a row vector containing all 1 s. Finally, at the receiver node 16 the received signal $\underline{z} \in \mathbb{C}^{1 \times n_s}$, given by:

$$\underline{z} = (w_B \odot h^*_{m_B \to B})^\dagger Z_B + j_B \underline{t}_B + \underline{n}_B \qquad \text{Equation 3}$$

where $\cdot \odot \cdot$ indicates the Hadamard product and $\cdot \dagger$ indicates the Hermitian conjugate. The first mosaic 14a transmit beamformer is represented with $v_A$ and the second mosaic 14b transmit beamformer with $w_B$. By combining these equations, a compound channel is given by:

$$\underline{z}_B = (w_B \odot h^*_{m_B \to B})^\dagger \qquad \text{Equation 4}$$
$$\{H_{m_A \to m_B}[(v_A \underline{1}) \odot (h_{A \to m_A} + J_{m_A} T_{m_A} + N_{m_A})] + J_{m_B} T_{m_B} + N_{m_B}\} + j_B \underline{t}_B + \underline{n}_B$$

By separating the propagation of the signal and propagation of the interference-plus-noise, the SINR$_B$ at the receiver node 16 is constructed, which is given by:

$$SINR_B = \frac{\|\hat{\underline{s}}_B\|^2}{\|\hat{\underline{n}}_B\|^2} \qquad \text{Equation 5}$$

$$\hat{\underline{s}}_B = (w_B \odot h^*_{m_B \to B})^\dagger \{H_{m_A \to m_B}[(v_A \underline{1}) \odot (h_{A \to m_A} \hat{\underline{s}}_A)]\} \qquad \text{Equation 6}$$

$$\hat{\underline{n}}_B = (w_B \odot h^*_{m_B \to B})^\dagger \qquad \text{Equation 7}$$
$$\{H_{m_A \to m_B}[(v_A \underline{1}) \odot (J_{m_A} T_{m_A} + N_{m_A})] + J_{m_B} T_{m_B} + N_{m_B}\} + j_B \underline{t}_B + \underline{n}_B$$

where $\|\cdot\|$ indicates the L2 norm. Given the compound $SINR_B$, the system channel capacity C (b/s) can be calculated. This capacity is given by:

$$C = B \log_2(1 + SINR_B) \quad \text{Equation 8}$$

where B is the signal bandwidth observed at passband.

Beamformer Optimization Approaches

A hybrid beamformer optimization approach is implemented to reduce computational complexity and use of radio resources. To explain the hybrid approach, two classes of beamformer optimization approaches are first defined: iterative and full channel estimation. Because an explicit form for $SINR_B$ is given in Equation 7, an approach, such as greedy searches, could be used to iteratively find the optimal solutions for $v_A$ and $w_B$. The advantage of an iterative approach is that no explicit channel estimation needs to be performed. One could start with random beamformers and over time converge to a good solution. The disadvantage is the rate of convergence in a high-dimensional space with significant interference is slow, too slow for embodiments of the distributed mosaic communications system.

Consequently, all propagation channels and interference-plus-noise covariance matrices are estimated to explicitly find the optimal beamformers. A related technique has been used for the problem of wideband transmit nulling for simultaneous transmission and reception. The advantage of this approach is, given channel estimates, the optimal beamformers can be quickly calculated. However, the significant load of constant channel estimation can be onerous. Furthermore, evaluation of the interference-plus-noise covariance matrix is limited by the lack of high data-rate links between mosaic nodes. Therefore, a mixed solution of direct estimation and tracking is pursued.

MIMO Transmit Techniques

Figure 9:
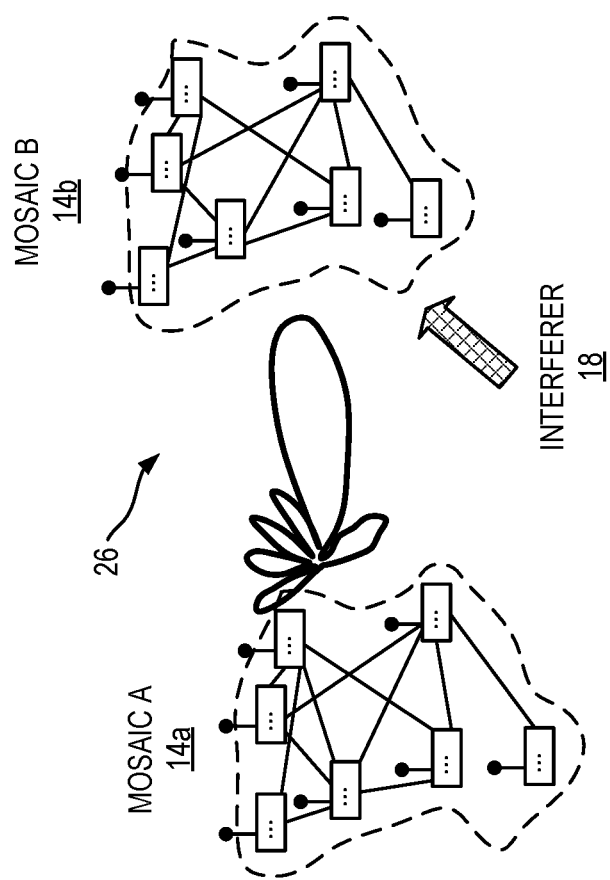
FIG. 9 is a topological diagram of a basic multiple-input multiple-output (MIMO) channel in the presence of an interferer.

FIG. 9 is a topological diagram of a basic MIMO channel 26 in the presence of an interferer 18. For the sake of clarity, a narrowband MIMO system is first considered, notionally depicted in FIG. 9 with perfect channel knowledge. It is worth noting that this just a portion of the overall system and it is challenging to directly estimate the interference-plus-noise covariance without exchanging IQ-data. However, this discussion guides this approach. Again, for the sake of clarity, a narrowband model is considered and later extended to a dispersive model.

The fundamental channel capacity in terms of spectral efficiency c (b/s/Hz) of this system is given by:

$$c = \log_2 \left| I + R_{m_B}^{-1/2} H_{m_A \to m_B} P_{m_A} H_{m_A \to m_B}^\dagger R_{m_B}^{-1/2} \right| \quad \text{Equation 9}$$

where I is the identity matrix, $$R_{m_B} \in \mathbb{C}^{n_{m_B} \times n_{m_B}},$$

given by expectation:

$$R_{m_B} = \frac{1}{n_s} E\left[ (J_{m_B} T_{m_B} + N_{m_B})(J_{m_B} T_{m_B} + N_{m_B})^\dagger \right] \quad \text{Equation 10}$$

where $N_{m_B}$ is the interference-plus-noise spatial covariance matrix, $H_{m_A \to m_B}$ is the channel matrix that contains all the complex attenuations between each transmit and receive antenna, and $P_{m_A}$ is the transmit covariance matrix.

The optimal solution to maximize channel capacity of Equation 9 is given by spatial water filling. The specific solution is a function of the singular value spectrum of the whitened channel matrix $R^{-1/2}_{m_B} H_{m_A \to m_B}$ and the received SINR. In the rich channel and high SINR regime, there are solutions that are represented by transmit covariance proportional to the identity matrix. Commercial systems often operate in this regime and space-time block codes (STBC) typically produce such a transmit covariance matrix. In the lower power and more correlated channel limit, the optimal solution is to use a rank-1 covariance, which is given by transmit beamforming. In the case of wideband beamforming this solution becomes a rank that is equal to the number of taps in the filters. Using more than a single transmit mode is considered for robustness, but the baseline approach is to employ this low-rank approach.

The optimal transmit beamformer is given by evaluating the whitened channel matrix and using the dominant right-hand singular vector $v_1$ so that the resulting transmit covariance matrix is given by:

$$P \propto v_1 v_1^\dagger \quad \text{Equation 11}$$

where the singular value decomposition is given by:

$$U \sum V^\dagger = R^{-1/2} H \quad \text{Equation 12}$$

$$V = [v_1 \ v_2 \ v_3 \ \cdots] \quad \text{Equation 13}$$

the columns of U contain the optimal matched receive beamformers, the diagonal matrix $\Sigma$ contains the singular values, and columns of V contain the optimal transmit beamformers.

Because of channel dynamics, the receive beamformer is typically re-estimated and U is ignored. In simple line-of-sight environments, the beamforming effect of the transmit beamformer may look like a traditional, if sparse, beam pattern. However, in more complicated environments, it may be difficult to interpret the beam pattern from a traditional beamforming perspective. While it is tempting to invoke reciprocity in evaluating these systems, because $H_{m_B \to m_A} = H^T_{m_A \to m_B}$, it is worth noting that the whitened channel matrices do not observe reciprocity. Consequently, more care is needed in the optimization.

MIMO Beam Patterns

Figure 10:
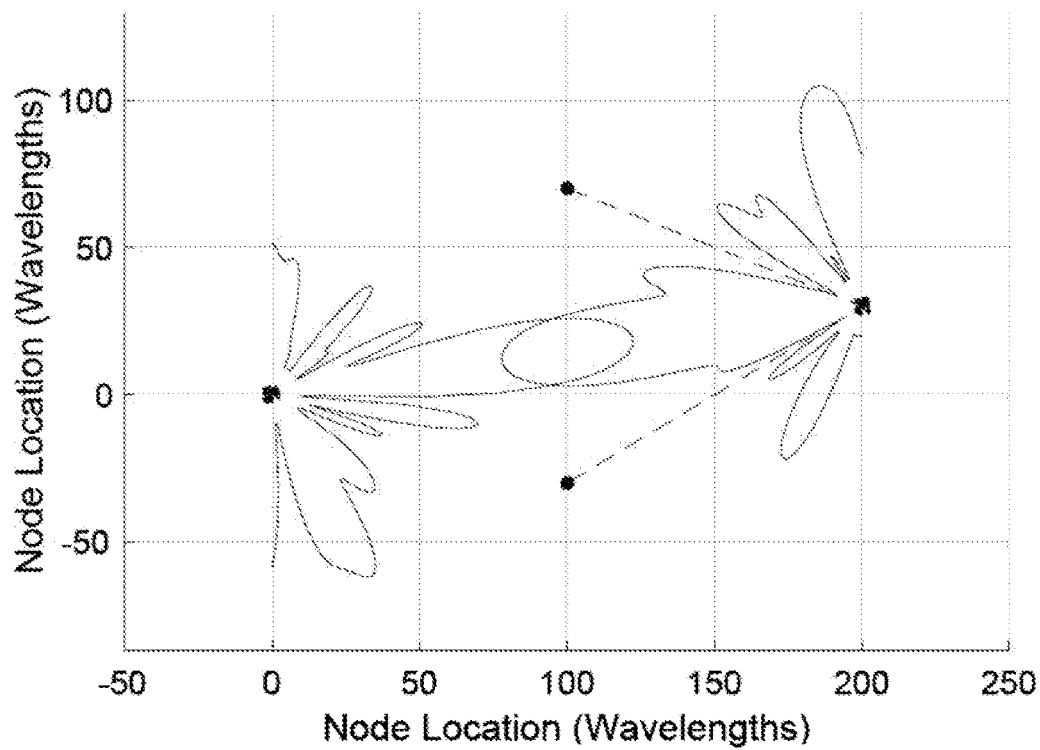
FIG. 10 is a graphical representation of transmit and receive beam patterns for mosaics of 30 nodes that are placed randomly within a box of 5 wavelengths on a side.
Figure 11:
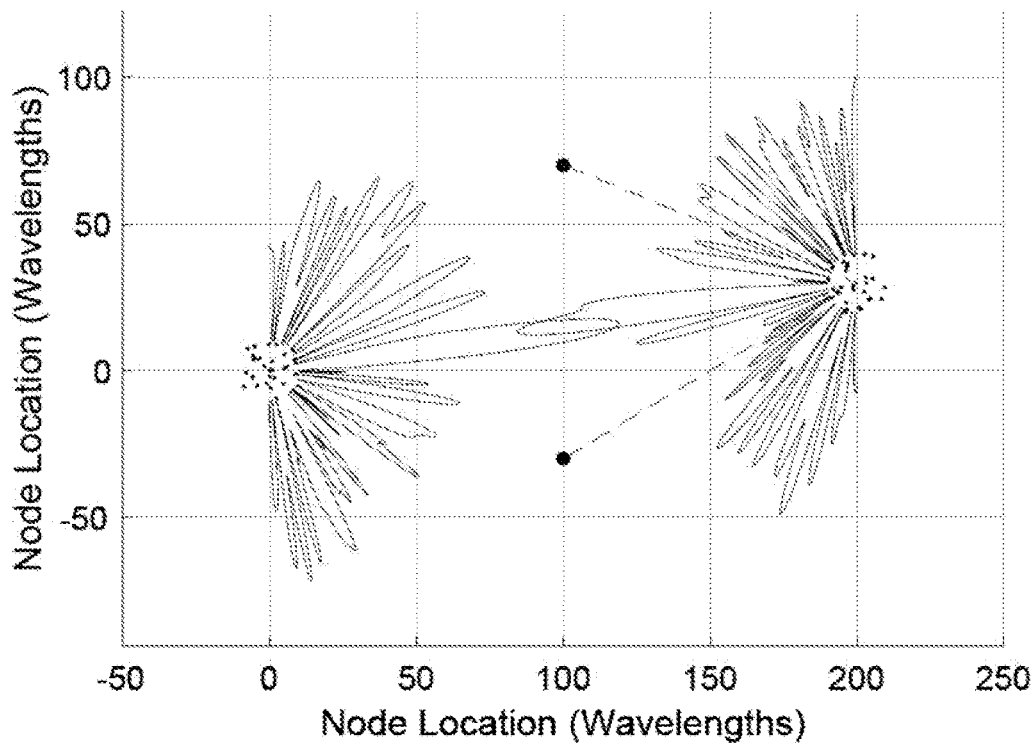
FIG. 11 is a graphical representation of transmit and receive beam patterns for mosaics of 30 nodes that are placed randomly within a box of 20 wavelengths on a side.
Figure 12:
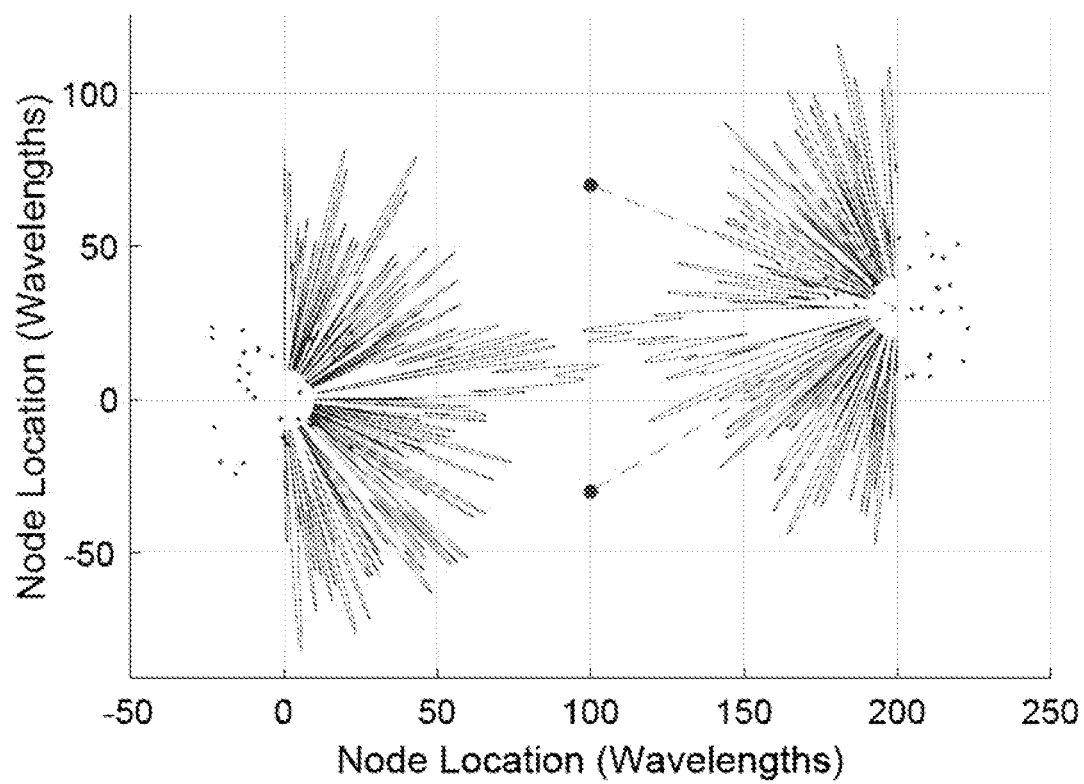
FIG. 12 is a graphical representation of transmit and receive beam patterns for mosaics of 30 nodes that are placed randomly within a box of 50 wavelengths on a side.

FIG. 10 is a graphical representation of transmit and receive beam patterns for mosaics of 30 nodes that are placed randomly within a box of 5 wavelengths on a side. FIG. 11 is a graphical representation of transmit and receive beam patterns for mosaics of 30 nodes that are placed randomly within a box of 20 wavelengths on a side. FIG. 12 is a graphical representation of transmit and receive beam patterns for mosaics of 30 nodes that are placed randomly within a box of 50 wavelengths on a side.

The beam patterns are associated with the dominant right-hand (transmit, on the left of the figures) and left-hand (receive, on the right of the figures) singular vectors determined by the singular value decomposition of the whitened channel matrix as presented in Equation 13. In terms of distances, this is clearly a small-scale example. However, it is informative. The centers of the boxes are offset by 200 wavelengths horizontally and 30 wavelengths vertically. Additionally, two interference sources are included. All channels assume line-of-sight propagation.

In the figures, a transition is observed from a reasonably easy to understand beam pattern for a smaller constraint box of 5 by 5 wavelengths to a more complicated pattern for the larger constraint boxes. For the smaller constraint box with a dense set of nodes, the transmit beam pattern points clearly at the receive nodes. The nulls clearly minimize the energy received from the interferers. As the constraint box increases in size to 20 and 50 wavelengths, the beam patterns become more complicated. In particular, for the 50 wavelengths box, the beam pattern lobing structure is more complicated. it is clear that the beam has multiple lobes directed at the receiver, and the receiver has corresponding lobes directed toward the transmitter. The nulls are still present, although they are somewhat difficult to see.

SIMO-MISO Beamforming Technique

To translate the mosaic transmit beamforming optimization to the SIMO-MIMO topology depicted in FIGS. 6A and 6B, embodiments need to compensate for the phase and amplitude effects imbedded in the SIMO channel $h_{A \to m_B}$. To include this effect, the product of the channel and beamformer elements needs to correspond to the dominant column of V so that:

$$v_A \odot h_{A \to m_B} = v_1 \qquad \text{Equation 14}$$

MISO Beamforming Technique

The last significant stage of the compound system performs interference mitigation. The distributed mosaic communications system could employ the dominant left-hand singular vector of U from Equation 13 to construct the receive beamformer. However, because of sensitivity of the receive beamformer to slight changes in the channel, it is often of value to re-estimate the beamformer. To do this a spatial (extended to space-time) linear sampled minimum-mean-squared-error (MMSE) beamformer is considered.

The traditional receive MMSE beamformer is described here, and it is noted that for the distributed mosaic communications system this "receive" beamforming is implemented in the second mosaic 14b to receiver node 16 link by using a novel transmit beamforming approach, as depicted in FIGS. 1, 2, and 3.

Figure 13:
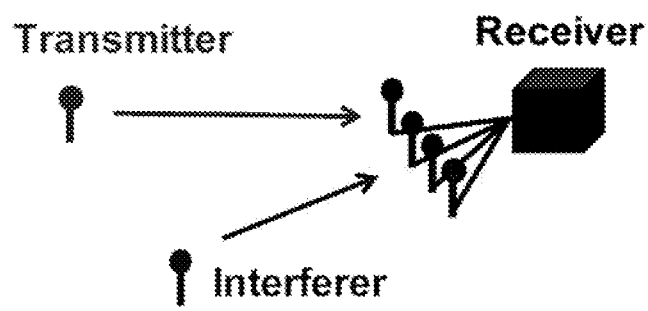
FIG. 13 is a topological diagram of a distributed mosaic communications system with a single mosaic in the present of interferers.

FIG. 13 is a topological diagram of a distributed mosaic communications system with a single mosaic in the presence of interferers. Typically, an array of receive antennas would be wired to a central processing system.

For this receive processing of $n_{m_B}$ receive antennas and n received training samples $s_{tr} \in \mathbb{C}^{1 \times n_R^s}$, the narrowband beamformer $w \in \mathbb{C}^{n_R \times 1}$ is given by:

$$w = C^{-1} \rho \qquad \text{Equation 15}$$

$$\approx (Z_{tr} Z_{tr}^\dagger)^{-1} Z_{tr} s_{tr}^\dagger \qquad \text{Equation 16}$$

$$C = \frac{1}{n_s} E\left[ (h s_{tr} + JT + N)(h s_{tr} + JT + N)^\dagger \right] \qquad \text{Equation 17}$$

$$\rho = \frac{1}{n_s} E\left[ Z_{tr} s_{tr}^\dagger \right] \qquad \text{Equation 18}$$

$$\hat{s}_{data} = w^\dagger Z_{data} \qquad \text{Equation 19}$$

where JT+N indicates the interference and noise contributions. The beamformer is applied to later data matrices of received data $Z_{data}$. It is worth noting that this covariance estimate C and R, found in Equation 10, differs by the inclusion of the signal of interest. C can be replaced with R and the performance is the same up to a known shift in scale.

The distributed mosaic communications system generally does not have wired connections between the second mosaic 14b and the receiver node 16. Consequently, this receive beamforming is implemented by transmit beamforming the signal to the receiver node 16 with the appropriate complex gains such that:

$$w = w_B \odot h^*_{m_B \to B} \qquad \text{Equation 20}$$

where $w_B \in$ $$\mathbb{C}^{n_{m_B} \times 1}$$

is the actual applied beamformer and $h_{m_B \to B} \in$ $$\mathbb{C}^{n_{m_B} \times 1}$$

is the channel between the elements of the second mosaic 14b and the receiver node 16.

Simulated Performance Characterization

For the scenario depicted in FIGS. 6A and 6B, the SINR at the receiver node 16 is estimated under a variety of scenarios as a function of the number of nodes N in both mosaics. Here, a narrowband problem is assumed for simplicity of presentation. In these simulations, it is assumed that the mosaics are approximately time aligned and can contain phase coherence over the duration of usage. Channel and covariance estimates are performed by using 100 samples. It is assumed that the node to mosaic channels are well estimated because they are close. The mosaic-to-mosaic channel and second mosaic 14b interference-plus-noise covariance matrices are the primary challenges. A SISO receive SNR is assumed to be −20 decibels (dB). Three propagation environments with spatial Rician channels with K-factors of 10, 0, and −10 dB are considered.

Figure 14:
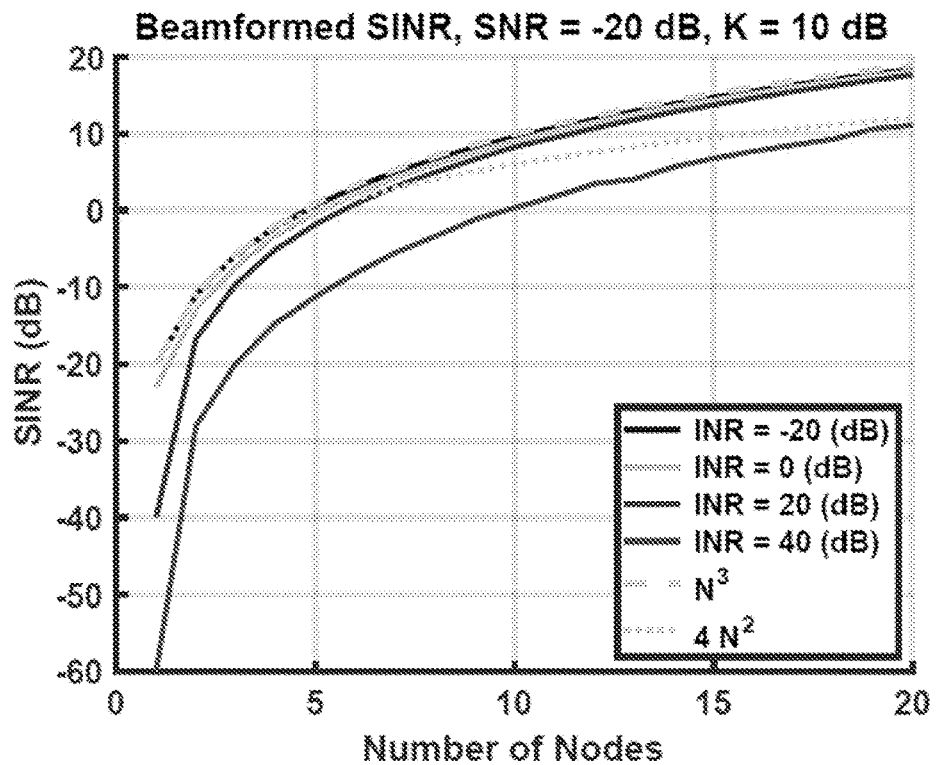
FIG. 14 is a graphical representation of beamformer output signal-to-interference-plus-noise ratio (SINR) scaling as a function of mosaic network size for a transmitter node to first mosaic to second mosaic to receiver node link assuming a Rician K-factor of 10 decibels (dB).
Figure 16:
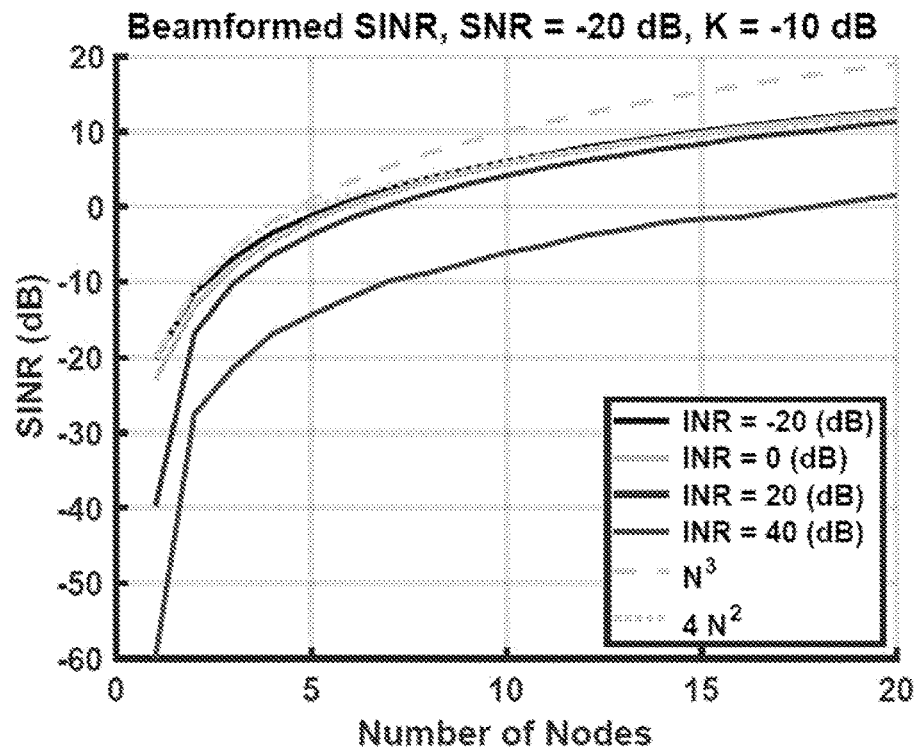
FIG. 16 is a graphical representation of beamformer output SINR scaling as a function of mosaic network size for a transmitter node to first mosaic to second mosaic to receiver node link assuming a Rician K-factor of −10 dB.

FIG. 14 is a graphical representation of beamformer output SINR scaling as a function of mosaic network size for a transmitter node 12 to first mosaic 14a to second mosaic 14b to receiver node 16 link assuming a Rician K-factor of 10 dB. FIG. 10 is a graphical representation of beamformer output SINR scaling as a function of mosaic network size for a transmitter node 12 to first mosaic 14a to second mosaic 14b to receiver node 16 link assuming a Rician K-factor of 0 dB. FIG. 16 is a graphical representation of beamformer output SINR scaling as a function of mosaic network size for a transmitter node 12 to first mosaic 14a to second mosaic 14b to receiver node 16 link assuming a Rician K-factor of −10 dB.

The spatial Rician channel is parameterized with the K-factor if there is a low-rank channel component of the form:

$$u_0 v_0^\dagger \qquad \text{Equation 21}$$

such that $\|u_0\|^2 = n_{m_B}$ and $\|v_0\|^2 = n_{m_A}$ and an i.i.d. complex circularly symmetric Gaussian component G with element unit variance, a given draw of the overall channel is then given by:

$$H = \sqrt{\frac{K}{K+1}} u_0 v_0^\dagger + \sqrt{\frac{1}{K+1}} G \qquad \text{Equation 22}$$

Figure 15:
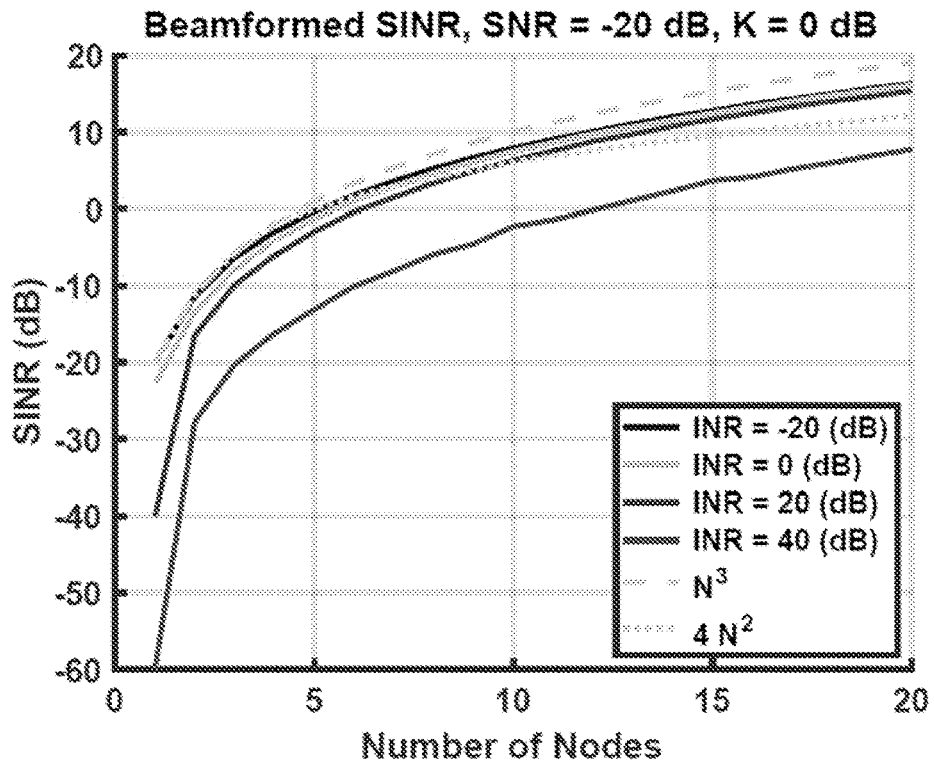
FIG. 15 is a graphical representation of beamformer output SINR scaling as a function of mosaic network size for a transmitter node to first mosaic to second mosaic to receiver node link assuming a Rician K-factor of 0 dB.

The channel in FIG. 14 is considered to be the most representative of the expected performance because significant line-of-sight contributions are anticipated for these links. However, FIGS. 15 and 16 are included for completeness. For each of these figures, interference-to-noise ratios of −20, 0, 20, and 40 dB are considered. Additionally, scaling curves of $N^3$ and $4N^2$ are included. The $N^3$ curve corresponds to the ideal scaling of SINR performance in the case of a channel with a low-rank channel such as a line-of-sight channel. The $4N^2$ scaling, which is valid for N>4, is appropriate for a rich scattering environment such as a Gaussian channel. This result comes from asymptotic random matrix theory. The form is valid for large N under the Gaussian channel model.

Nearly ideal performance is observed in FIG. 14 for INRs of −20, 0, and 20 dB. In the case of INR of 40 dB, some degradation is observed. Ideal performance can be recovered by increasing the integration used for mosaic-to-mosaic channel estimation or by using this result as an initial beamformer that is improved by an iterative solution.

As the Rician K-factor is decreased to 0 dB in FIG. 15, only a slight reduction in performance is observed. As essentially all of the low-rank contribution is removed with K=−10 dB in FIG. 15, the performance converges to the expected $4N^2$ scaling. It is worth noting that even non-light of sight environments typically have components that are more correlated than the independently sampled Gaussian model that results in the $4N^2$ scaling.

Hybrid Beamformer Approaches

A hybrid approach is employed to optimize the beamformers. The node-to-mosaic channels and mosaic-to-mosaic channels are estimated directly by embedding training signals as underlays. Because of limited signaling data rates between the mosaic and node networks, estimation of the interference-plus-noise covariance matrix is somewhat more challenging.

Figure 17:
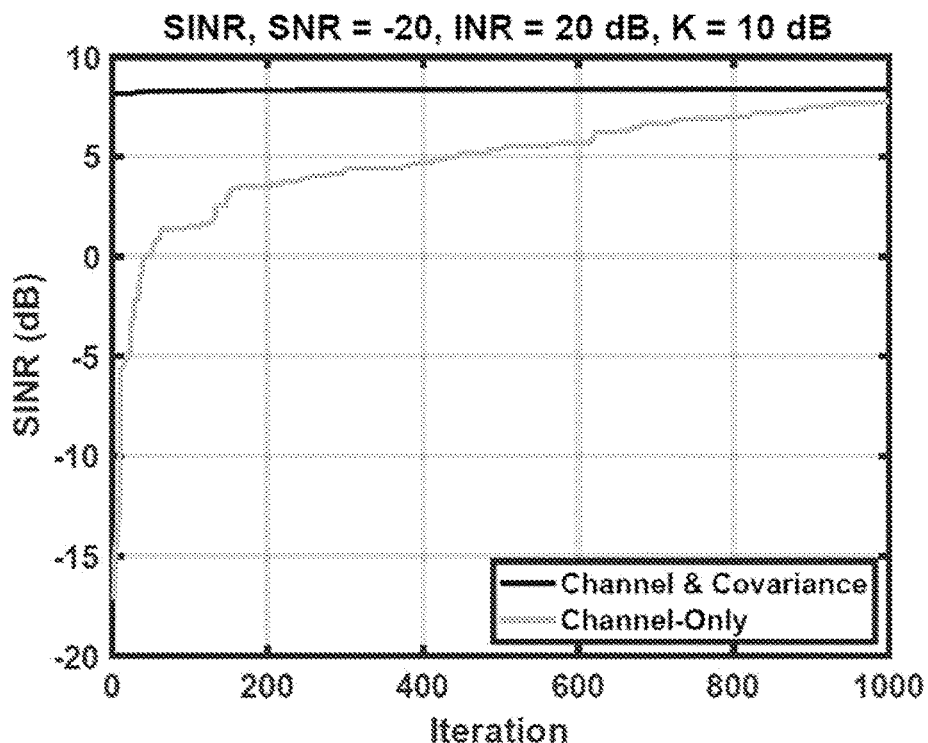
FIG. 17 is a graphical representation of beamformer output SINR scaling as a function of iteration for a transmitter node to first mosaic to second mosaic to receiver node link.

FIG. 17 is a graphical representation of beamformer output SINR scaling as a function of iteration for a transmitter node 12 to first mosaic 14a to second mosaic 14b to receiver node 16 link. FIG. 17 shows the convergence to near optimal SINR performance under two scenarios. In one case, all channels are estimated, and in the other case all channels are estimated, and the interference-plus-noise covariance is directly estimated. The advantage of directly estimating the interference-plus-noise covariance matrix is clear.

This motivates the use of a low-data-rate approach to provide a covariance matrix estimate. The covariance is estimated by having all nodes in a mosaic network simultaneously collect 100 samples. These nodes then transmit the samples to the transmitter node 12/receiver node 16 at a low date rate. The transmitter node 12/receiver node 16 then combines the information to estimate the covariance matrix. With these estimates, the beamformers are calculated. An iterative approach is then employed to improve and track the beamformer as the channel evolves.

Wideband Extension

Because of dispersion in the channel or even resolvable differences between mosaic nodes, wideband extensions to the development of the beamformers $v_A$ and $w_B$ found in Equation 4 are employed. Instead of a set of complex coefficients associated with each transmitter, a set of predistortion filters is employed. One can employ alternative approaches such as frequency-domain equalization; however, for moderate delay spread, the tap-delay-line approach requires the estimation of few coefficients. This predistortion filter, or equivalently tap-delay-line, approach on the DARPA CLASS program and for MIMO self-interference mitigation experiments was demonstrated. These filters compensate for channel effects and for relative subsample delays between beamformer antennas.

The space-time beamformers are evaluated by incorporating a lattice of delays into the channel matrix. The optimal "beamformers" now incorporate sets of predistortion filters rather than complex coefficients. We define $H_\tau \in$ $$\mathbb{C}^{n_{m_B} \times n_{m_A}}$$

to be the channel matrix component for some relative delay $\tau$. $H_\tau$ can be estimated for a lattice of useful delays $\tau$ and use these to build a space-time channel $H \in$ $$\mathbb{C}^{(n_{\delta_B} n_{m_B}) \times (n_{\delta_A} n_{m_A})},$$

given by:

$$\tilde{H} = \begin{pmatrix} \ddots & & \vdots & & \\ \cdots & H_{\tau_{-1}} & H_{\tau_0} & H_{\tau_1} & \cdots \\ \cdots & & H_{\tau_{-1}} & H_{\tau_0} & H_{\tau_1} & \cdots \\ \cdots & & & H_{\tau_{-1}} & H_{\tau_0} & H_{\tau_1} & \cdots \\ & & \vdots & & \ddots \end{pmatrix} \in \mathbb{C}^{(n_{\delta_B} n_{m_B}) \times (n_{\delta_A} n_{m_A})} \qquad \text{Equation 23}$$

The set of $H_\tau$s is estimated by using the least squared error estimator, given by:

$$[\cdots \ H_{\tau_{-1}} \ H_{\tau_0} \ H_{\tau_1} \ \cdots] = Z\tilde{S}_{tr}^\dagger (\tilde{S}_{tr} \tilde{S}_{tr}^\dagger)^{-1} \qquad \text{Equation 24}$$

where:

$$\tilde{S}_{tr} = \begin{pmatrix} \vdots \\ S_{tr,\tau_{-1}} \\ S_{tr,\tau_0} \\ S_{tr,\tau_1} \\ \vdots \end{pmatrix}$$

and the $n_s$ samples of training data sent from all elements of the first mosaic 14a to the second mosaic 14b are given by $S_{tr} \in$ $$\mathbb{C}^{n_{m_A} \times n_s}.$$

A temporally shifted version of $S_{tr}$ is indicated by using $S_{tr,\tau}$. This formalism supports either code-division or time-division approaches. This channel estimation approach supports distributed channel estimation.

By employing the same approach as used in Equation 13, the dominant right-hand and left-hand singular vectors are identified. The filter coefficients are interspersed in this vector spaced by the number of elements in the mosaic. These vectors are estimated at the receiver node 16 and distributed amongst the mosaic nodes 20. In a somewhat more subtle implementation trade, for the sake of robustness and improved computational performance, the first mosaic 14a beamformer is optimized, associated with the right-hand singular vector of $\tilde{H}$ under the assumption of fewer second mosaic 14b taps than are actually used at the second mosaic 14b. The second mosaic 14b to receiver node 16 beamformer is reevaluated under the condition of the larger number of taps which is particularly useful for nulling of jammer.

Local Mosaic Synchronization and Coherence

To enable accurate channel estimation, reasonably accurate synchronization between the nodes of a particular mosaic and its associated transmitter node 12/receiver node 16 is needed. These nodes operate with independent, imperfect clock sources. Low-cost local oscillators are not stable enough to maintain the required coherence, so these users must be synchronized digitally. External references such as the Global Positioning System (GPS) may facilitate this process, but are susceptible to jamming and spoofing. A joint communications and two-way ranging (TWR) architecture is used, which is denoted as Communications and High-Precision Positioning (CHP2). This approach allows for nodes which agree on time and frequency.

The cyclic exchange of this information drives a synchronization algorithm that simultaneously estimates the time-of-flights (ToF) $\tau$, time offsets T, and phase offsets <p between users. From this information, extremely precise phase and frequency offset estimates can be extracted to digitally synchronize all of the users in the network.

Figure 18:
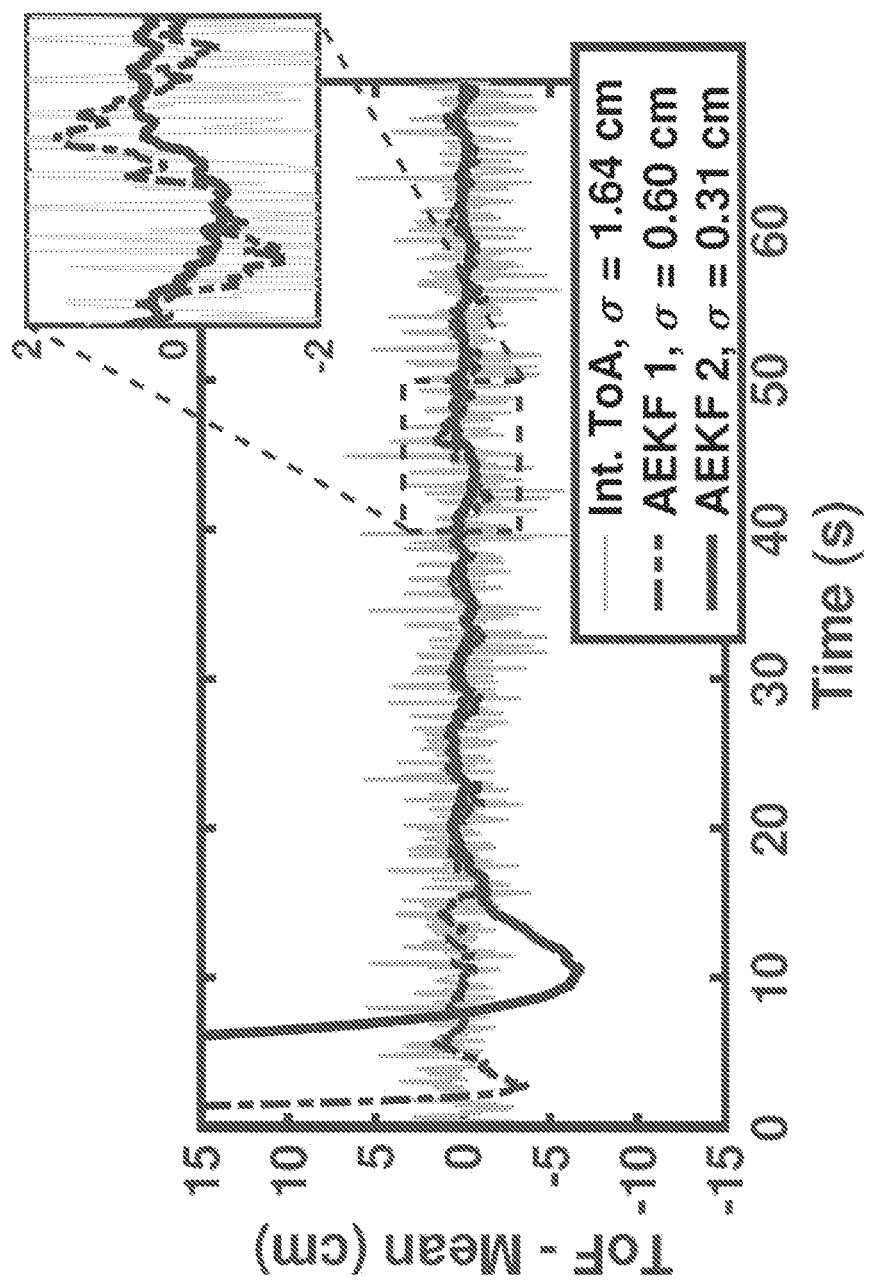
FIG. 18 is a graphical representation of ranging performance in an implementation using a base station and an unmanned aerial vehicle (UAV) as an edge node.

FIG. 18 is a graphical representation of ranging performance in an implementation using a base station and an unmanned aerial vehicle (UAV) as an edge node. A real-time version of this technique was implemented and validated on a consumer-grade hardware platform. A live demonstration was performed using a ground-station as the base node and a UAV as an edge node. Using 10 MHz bandwidth, ranging precision below 10 cm and time synchronization below 100 picoseconds was demonstrated. In a cabled test environment with improved techniques, the implementation is demonstrated to support mm ranging accuracy and picosecond time synchronization using low-cost, consumer-grade hardware with inexpensive crystal oscillators.

Unlike most distributed-coherent systems, this is the absolute error. Typically, distributed-coherent systems are not sensitive to a moderate number of carrier phase $2\pi$ cycle errors if the phase is accurate. Thus, the demonstrated performance exceeds the needs of the distributed mosaic communications system. Thus, embodiments can employ a reduced complexity implementation that maintains the phase accuracy but allow for some number of carrier phase $2\pi$ cycle errors.

Evaluation

The feasibility of this approach is demonstrated through a small-scale evaluation. An example is implemented, consisting of a transmitter node 12 to four-node mosaic to four-node mosaic to receiver node 16 system. The procedure implemented follows the "bent pipe" model. The mosaics function essentially as relays but affect its reception before transmitting such that the signals coherently combine at the next receiving stage. Each node within the mosaic extracts the signal to be forwarded, adds its unique training sequence, applies a beamformer weight, and sends this waveform over the air.

The WISCANET Software Defined Radio Network is used to quickly prototype the algorithm. WISCANET has been upgraded to support N×N phase coherent transmit and receive. This evaluation uses a set of NI Ettus radios as surrogates for the transmitter node 12/receiver node 16 and mosaic nodes, operating at 907 MHz in the ISM band. The evaluation uses a signal bandwidth of approximately 1 MHz of bandwidth. Genie channel feedback is facilitated by utilizing WISCANET's stop-and-go functionality and transferring information between radios before the next step in the transmission cascade.

Figure 19:
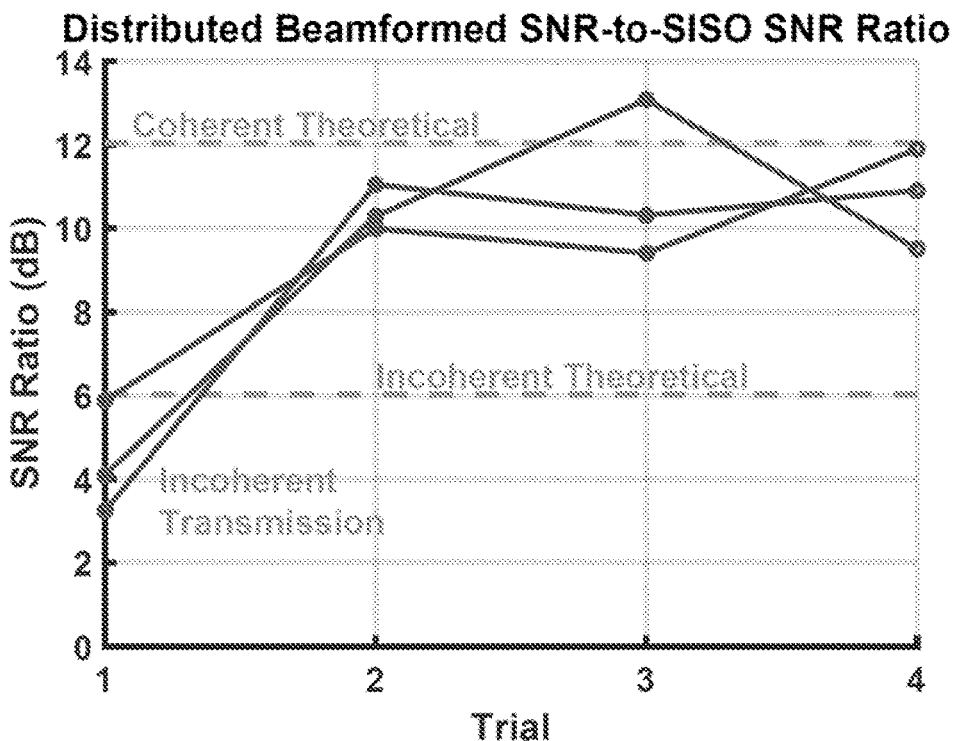
FIG. 19 is a graphical representation of the ratio of beamformed-to-single-antenna to single-antenna (SISO) signal-to-noise ratio (SNR) in an evaluated transmitter node to 4-node mosaic to 1-node mosaic to receiver node embodiment.

FIG. 19 is a graphical representation of the ratio of beamformed-to-SISO SNR in an evaluated transmitter node 12 to 4-node mosaic to 1-node mosaic to receiver node 16 embodiment. For this scenario (1-4-1-1), an evaluation of the ratio of beamformed-to-SISO SNR is provided over three separate runs. The mosaics provide beamforming but are otherwise sampled signal bent-pipe relays. In the first trial of each run, the channel is not known; thus, signal power is incoherently combined. An improvement of about 6 dB is expected in this case. Because the distribution of the channel attenuations is not ideal and SNR estimates are imperfect, the SNR ratio is slightly less. For trial numbers 2, 3, and 4, there are channel estimates, and the performance averages near the ideal performance of $4^2=12$ dB. Again, measurement fluctuations and channel non-idealities cause slight variations.

Figure 20:
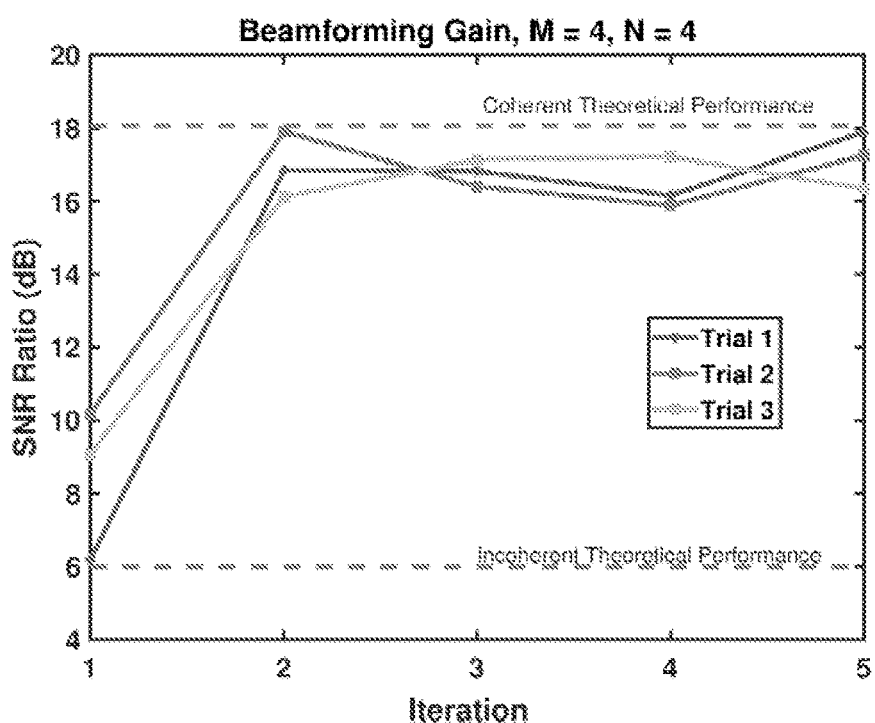
FIG. 20 is a graphical representation of the ratio of beamformed-to-SISO SNR in an evaluated transmitter node to 4-node mosaic to 4-node mosaic to receiver node embodiment.

FIG. 20 is a graphical representation of the ratio of beamformed-to-SISO SNR in an evaluated transmitter node 12 to 4-node mosaic to 4-node mosaic to receiver node 16 embodiment. For this scenario (1-4-4-1), an evaluation of the ratio of beamformed-to-SISO SNR is provided over three separate runs. Both mosaics provide beamforming but are otherwise sampled signal bent-pipe relays. In the first trial of each run, the channel is not known; thus, signal power is incoherently combined. An improvement of about 6 dB is expected in this incoherent case. Because the distribution of the channel attenuations is not ideal SNR estimates are imperfect, the SNR ratio is slightly less. For trial numbers 2, 3, 4, and 5 there are channel estimates, and the performance averages near the ideal performance of $4^3=18$ dB. Again, measurement fluctuations and channel non-idealities cause slight variations.

Flow Diagram

Figure 21:
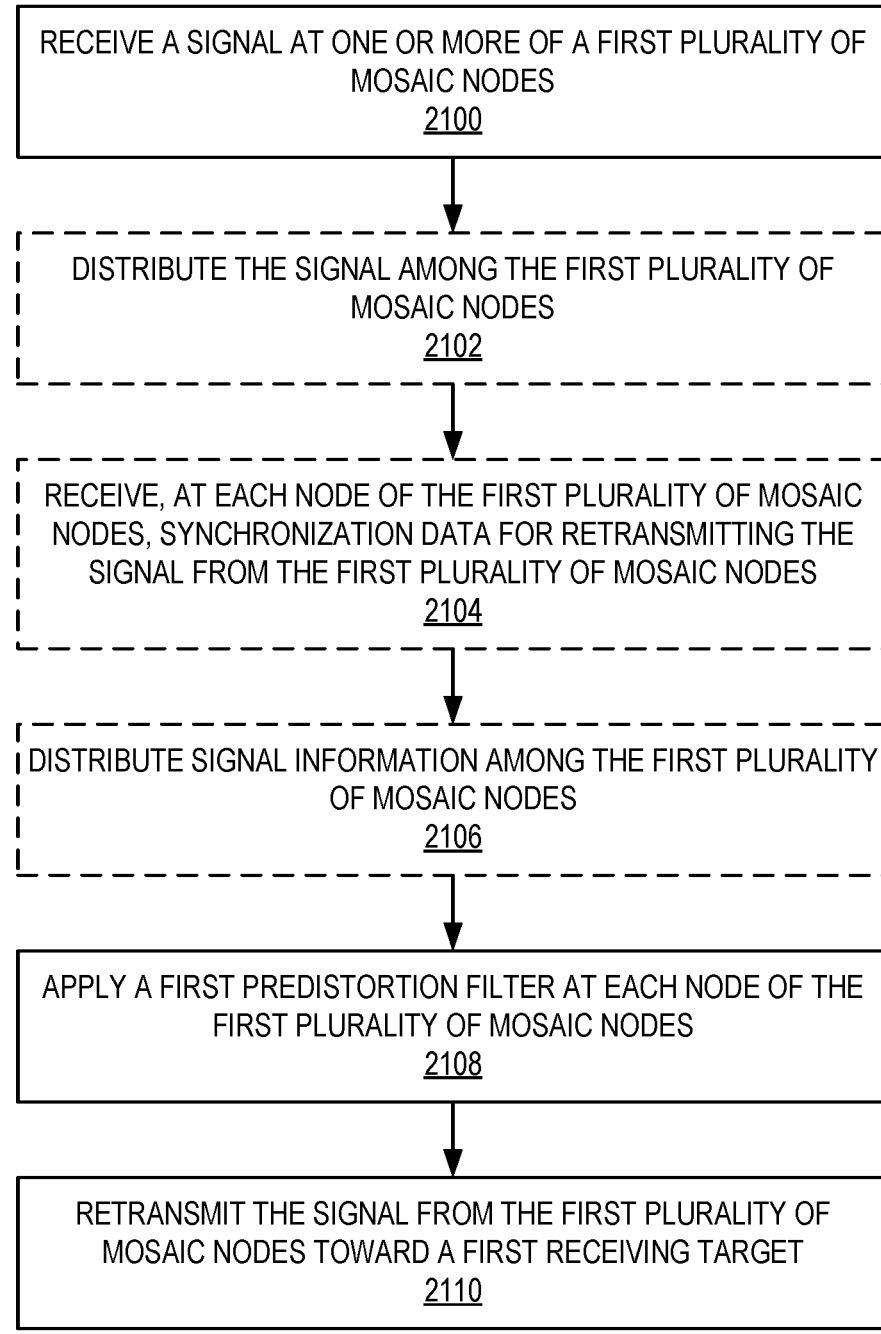
FIG. 21 is a flow diagram illustrating a process for beamforming in a distributed wireless network.

FIG. 21 is a flow diagram illustrating a process for beamforming in a distributed wireless network. The process begins at operation 2100, with receiving a signal at one or more of a first plurality of mosaic nodes. The process optionally continues at operation 2102, with distributing the signal among the first plurality of mosaic nodes. The process optionally continues at operation 2104, with receiving, at each node of the first plurality of mosaic nodes, synchronization data for retransmitting the signal from the first plurality of mosaic nodes. The process optionally continues at operation 2106, with distributing signal information among the first plurality of mosaic nodes. The signal information can include time and frequency data, data representative of the signal, interference data, and/or channel data.

The process continues at operation 2108, with applying a first predistortion filter at each node of the first plurality of mosaic nodes. In an exemplary aspect, the first predistortion filter is constructed based on the signal information. The process continues at operation 2110, with retransmitting the signal from the first plurality of mosaic nodes toward a first receiving target. In this regard, the first predistortion filter causes a resulting first retransmitted signal to coherently combine at the first receiving target.

Although the operations of FIG. 21 are illustrated in a series, this is for illustrative purposes and the operations are not necessarily order dependent. Some operations may be performed in a different order than that presented. Further, processes within the scope of this disclosure may include fewer or more steps than those illustrated in FIG. 21.

Computer System

Figure 22:
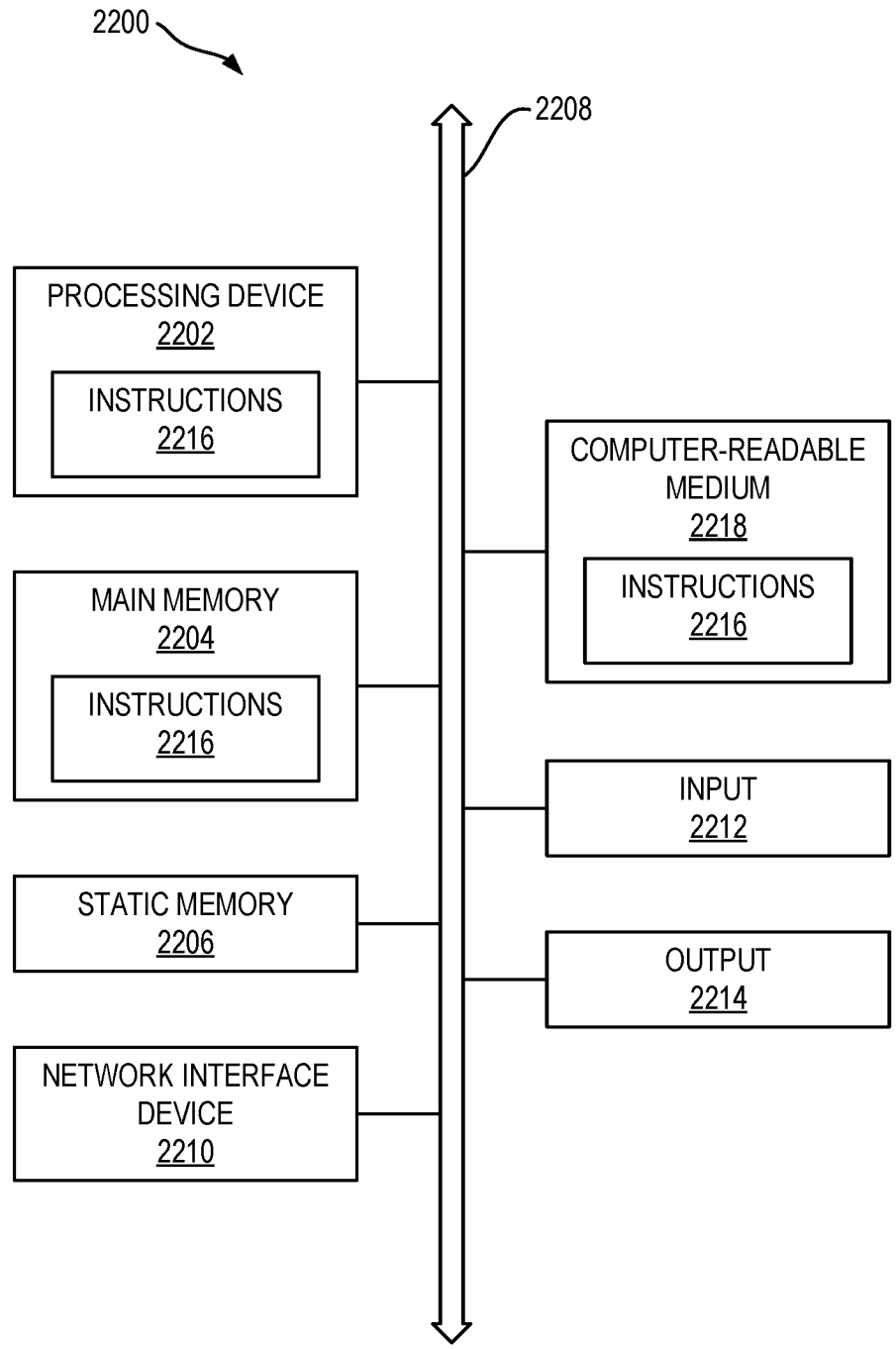
FIG. 22 is a schematic diagram of a generalized representation of an exemplary computer system that could be used to perform any of the methods or functions described above, such as beamforming in a distributed wireless network.

FIG. 22 is a schematic diagram of a generalized representation of an exemplary computer system 2200 that could be used to perform any of the methods or functions described above, such as beamforming in a distributed wireless network. In some examples, one or more of the transmitter node 12, the receiver node 16, or the mosaic nodes 20 of the first mosaic 14a or second mosaic 14b of FIG. 6A are implemented as the computer system 2200. In this regard, the computer system 2200 may be a circuit or circuits included in an electronic board card, such as, a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 2200 in this embodiment includes a processing device 2202 or processor, a main memory 2204 (e.g., read-only memory (ROM), flash memory, dynamic random-access memory (DRAM), such as synchronous DRAM (SDRAM), etc.), and a static memory 2206 (e.g., flash memory, static random-access memory (SRAM), etc.), which may communicate with each other via a data bus 2208. Alternatively, the processing device 2202 may be connected to the main memory 2204 and/or static memory 2206 directly or via some other connectivity means. In an exemplary aspect, the processing device 2202 could be used to perform any of the methods or functions described above.

The processing device 2202 represents one or more general-purpose processing devices, such as a microprocessor, central processing unit (CPU), or the like. More particularly, the processing device 2202 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 2202 is configured to execute processing logic in instructions for performing the operations and steps discussed herein.

The various illustrative logical blocks, modules, and circuits described in connection with the embodiments disclosed herein may be implemented or performed with the processing device 2202, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing device 2202 may be a microprocessor, or may be any conventional processor, controller, microcontroller, or state machine. The processing device 2202 may also be implemented as a combination of computing devices (e.g., a combination of a DSP and a microprocessor, a plurality of microprocessors, one or more microprocessors in conjunction with a DSP core, or any other such configuration).

The computer system 2200 may further include a network interface device 2210. The computer system 2200 also may or may not include an input 2212, configured to receive input and selections to be communicated to the computer system 2200 when executing instructions. The input 2212 may include, but not be limited to, a touch sensor (e.g., a touch display), an alphanumeric input device (e.g., a keyboard), and/or a cursor control device (e.g., a mouse). The computer system 2200 also may or may not include an output 2214, including but not limited to a display, a video display unit (e.g., a liquid crystal display (LCD) or a cathode ray tube (CRT)), or a printer. In some examples, some or all inputs 2212 and outputs 2214 may be combination input/output devices.

The computer system 2200 may or may not include a data storage device that includes instructions 2216 stored in a computer-readable medium 2218. The instructions 2216 may also reside, completely or at least partially, within the main memory 2204 and/or within the processing device 2202 during execution thereof by the computer system 2200, the main memory 2204, and the processing device 2202 also constituting computer-readable medium. The instructions 2216 may further be transmitted or received via the network interface device 2210.

While the computer-readable medium 2218 is shown in an exemplary embodiment to be a single medium, the term "computer-readable medium" should be taken to include a single medium or multiple media (e.g., a centralized or distributed database, and/or associated caches and servers) that store the one or more sets of instructions 2216. The term "computer-readable medium" shall also be taken to include any medium that is capable of storing, encoding, or carrying a set of instructions for execution by the processing device 2202 and that causes the processing device 2202 to perform any one or more of the methodologies of the embodiments disclosed herein. The term "computer-readable medium" shall accordingly be taken to include, but not be limited to, solid-state memories, optical medium, and magnetic medium.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

The invention claimed is:

1. A method for beamforming in a distributed wireless network, the method comprising:
   receiving a first signal at a first mosaic node of a first plurality of mosaic nodes, and
   transmitting a second signal from the first mosaic node toward a first receiving target, the second signal being based on:
   the first signal, and
   a first predistortion filter,
   the first predistortion filter being configured to coherently combine, at the first receiving target, the second signal with a third signal transmitted by a second mosaic node of the first plurality of mosaic nodes.

2. The method of claim 1, further comprising determining a closed form beamforming solution based on channel estimation and interference estimation for the first plurality of mosaic nodes.

3. The method of claim 1, wherein the first predistortion filter is based on channel and interference estimation for the first plurality of mosaic nodes.

4. The method of claim 1, further comprising distributing the first signal among the first plurality of mosaic nodes before transmitting the second signal from the first mosaic node.

5. The method of claim 4, further comprising receiving, at the first mosaic node, synchronization data for transmitting the second signal.

6. The method of claim 1, further comprising distributing signal information among the first plurality of mosaic nodes, wherein the first predistortion filter is based on the signal information.

7. The method of claim 6, wherein the signal information comprises time and frequency data for synchronization of the second signal and the third signal.

8. The method of claim 6, wherein the signal information comprises representative data of the first signal received at the first plurality of mosaic nodes.

9. The method of claim 6, wherein in response to the first predistortion filter coherently combining, at the first receiving target, the second signal with the third signal, signal power is concentrated in a direction of the first receiving target and interference is mitigated at the first receiving target.

10. The method of claim 6, wherein the signal information comprises channel data for transmitting the second signal and the third signal.

11. The method of claim 10, wherein the channel data comprises feedback data received from the first receiving target.

12. The method of claim 1, wherein the first receiving target comprises a third mosaic node, of a second plurality of mosaic nodes.

13. The method of claim 12, further comprising:
receiving the second signal and the third signal at the third mosaic node; and
transmitting a fourth signal from the third mosaic node toward a second receiving target, the fourth signal being based on the second signal and the third signal.

14. The method of claim 13, further comprising applying a second predistortion filter at the third mosaic node, wherein the second receiving target is a receiver node and the second predistortion filter is configured to coherently combine, at the receiver node, the fourth signal with a fifth signal transmitted by a fourth mosaic node, of the second plurality of mosaic nodes.

15. A first radio frequency (RF) node of a mosaic network, comprising:
a wireless transceiver; and
a processing circuitry coupled to the wireless transceiver and configured to:
receive a first RF signal at the wireless transceiver;
generate a second signal from the first RF signal based on a predistortion filter; and
transmit the second signal from the wireless transceiver in a direction of a receiving target, the predistortion filter being configured to coherently combine, at the receiving target, the second signal with a third signal transmitted by a second RF node of the mosaic network.

16. The first RF node of claim 15, wherein:
the predistortion filter coherently combines the second signal with the third signal to increase signal power in a direction of the receiving target;
the processing circuitry is further configured to estimate a wireless channel to the receiving target; and
the predistortion filter is based on the estimate of the wireless channel.

17. The first RF node of claim 16, wherein the processing circuitry is configured to:
calculate a closed form beamforming solution based on channel and interference estimation for a plurality of RF nodes of the mosaic network to determine the predistortion filter, the plurality of RF nodes comprising the first RF node and the second RF node; and
estimate the wireless channel based on feedback received from the receiving target.

18. A system, comprising a first network of mosaic radio frequency (RF) nodes, wherein a first mosaic RF node from among the first network of mosaic RF nodes is configured to:
receive a first RF signal from a transmitting RF node; and
wirelessly coordinate to beamform toward a target RF node, wherein a first predistortion filter of the first mosaic RF node is configured to coherently combine, at the target RF node, a second RF signal generated from the first RF signal with a third RF signal transmitted by a second mosaic RF node of the first network of mosaic RF nodes.

19. The system of claim 18, wherein the target RF node comprises a second network of mosaic RF nodes configured to beamform and transmit the second RF signal and the third RF signal received from the first network of mosaic RF nodes toward a receiving RF node.

20. The system of claim 19, further comprising:
the transmitting RF node; and
the receiving RF node.

* * * * *